US012804116B2

(12) United States Patent
Yasuda et al.

(10) Patent No.: US 12,804,116 B2
(45) Date of Patent: Nov. 17, 2026

(54) IMAGE PROCESSING DEVICE AND METHOD

(71) Applicant: SONY CORPORATION, Tokyo (JP)

(72) Inventors: Hiroyuki Yasuda, Saitama (JP); Ohji Nakagami, Tokyo (JP); Satoru Kuma, Tokyo (JP); Koji Yano, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 253 days.

(21) Appl. No.: 18/815,871

(22) Filed: Aug. 27, 2024

(65) Prior Publication Data

US 2024/0422300 A1 Dec. 19, 2024

Related U.S. Application Data

(62) Division of application No. 17/278,525, filed as application No. PCT/JP2019/036471 on Sep. 18, 2019, now Pat. No. 12,108,016.

(30) Foreign Application Priority Data

Oct. 2, 2018 (JP) ................................ 2018-187489

(51) Int. Cl.

*H04N 13/122* (2018.01)
*H04N 13/161* (2018.01)
*H04N 19/167* (2014.01)

(52) U.S. Cl.

CPC ......... *H04N 13/161* (2018.05); *H04N 13/122* (2018.05); *H04N 19/167* (2014.11)

(58) Field of Classification Search

CPC .. H04N 13/161; H04N 13/122; H04N 19/167; H04N 19/597; H04N 19/162; H04N 19/119; H04N 19/17; G06T 9/00

(Continued)

(56) References Cited

U.S. PATENT DOCUMENTS

| | | | | |
|---|---|---|---|---|
| 5,959,672 A * | 9/1999 | Sasaki | .................... | H04N 19/17 375/E7.218 |
| 8,718,149 B2 * | 5/2014 | Tanaka | ................... | H04N 19/44 375/E7.033 |

(Continued)

FOREIGN PATENT DOCUMENTS

| | | |
|---|---|---|
| JP | 2000-194843 A | 7/2000 |
| JP | 2010-507137 A | 3/2010 |

(Continued)

OTHER PUBLICATIONS

Rufael Mekuria et al., Design, Implementation and Evaluation of a Point Cloud Codec for Tele-Immersive Video, IEEE Transactions on Circuits and Systems for Video Technology, Jan. 2016, pp. 1-14, IEEE.

*Primary Examiner* — Ali Bayat

(74) *Attorney, Agent, or Firm* — Paratus Law Group, PLLC

(57) ABSTRACT

There is provided an image processing device and a method that enable partial decoding of 3D data to be performed more easily. Management information of a block as a partial region in a predetermined three-dimensional spatial region including 3D data representing a three-dimensional structure is generated. In addition, a block satisfying a condition specified by a user is selected on the basis of management information of the block as a partial region in a predetermined three-dimensional spatial region including 3D data representing a three-dimensional structure, and coded data of the 3D data within the selected block is decoded. The present disclosure can be applied to, for example, an image processing device, an electronic apparatus, an image processing method, a program, or the like.

14 Claims, 20 Drawing Sheets

(58) Field of Classification Search
USPC .......................................................... 382/154
See application file for complete search history.

(56) References Cited

U.S. PATENT DOCUMENTS

| | | | | |
|---|---|---|---|---|
| 2008/0056359 | A1* | 3/2008 | Isu | H04N 19/517 375/E7.199 |
| 2012/0275516 | A1* | 11/2012 | Tanaka | H04N 19/50 375/E7.243 |
| 2012/0320970 | A1* | 12/2012 | Drugeon | H04N 19/563 375/E7.026 |
| 2014/0079331 | A1* | 3/2014 | Komiya | H04N 19/124 382/233 |
| 2015/0172717 | A1 | 6/2015 | Zhao et al. | |
| 2016/0099047 | A1 | 4/2016 | Lee | |
| 2017/0214943 | A1 | 7/2017 | Cohen et al. | |
| 2017/0347120 | A1 | 11/2017 | Chou et al. | |
| 2019/0028711 | A1* | 1/2019 | Miyoshi | H04N 19/176 |
| 2021/0142522 | A1 | 5/2021 | Li et al. | |

FOREIGN PATENT DOCUMENTS

| | | | |
|---|---|---|---|
| KR | 10-2006-0118815 | A | 11/2006 |
| WO | WO 2007/074912 | A1 | 7/2007 |
| WO | WO 2018/083999 | A1 | 5/2018 |

* cited by examiner

FIG. 4

151

| KIND | INFORMATION NAME | DESCRIPTION | USAGE EXAMPLE |
|---|---|---|---|
| BLOCK INFORMATION | BLOCK IDENTIFICATION INFORMATION | IDENTIFICATION NUMBER, INDEX, OR LIKE | BLOCK IDENTIFICATION |
| | BLOCK POSITION | World COORDINATES OR LIKE | SELECTION OF BLOCK INCLUDING SPECIFIED RANGE |
| | BLOCK SIZE | SIZE, COORDINATES, SHAPE, OR LIKE | SELECTION OF BLOCK INCLUDING SPECIFIED RANGE |
| | DATA POSITION | OFFSET, ADDRESS, OR LIKE | EXTRACTION OF DATA OF SELECTED BLOCK |
| POINT INFORMATION | RESOLUTION | 3D DATA RESOLUTION OR LIKE (MINIMUM, MAXIMUM, AVERAGE, OR LIKE) | SELECTION OF BLOCK ACCORDING TO NECESSARY RESOLUTION (RESOLUTION SCALABILITY) |
| | STRUCTURE | DESCRIPTION OF SOLID STRUCTURE REPRESENTED BY 3D DATA OR LIKE | SELECTION OF BLOCK INCLUDING DATA OF SPECIFIED SOLID STRUCTURE |
| | DEGREE OF RELIABILITY | DEGREE OF RELIABILITY OF 3D DATA OR LIKE (ABSOLUTE VALUE, RELATIVE VALUE, OR LIKE) | SELECTION OF BLOCK ACCORDING TO NECESSARY DEGREE OF RELIABILITY (RELIABILITY DEGREE SCALABILITY) |
| ATTRIBUTE INFORMATION | COLOR | PRESENCE OR ABSENCE OF COLOR INFORMATION, NUMBER, OR LIKE | SELECTION OF BLOCK ACCORDING TO PRESENCE OR ABSENCE OF COLOR INFORMATION |
| | NORMAL | PRESENCE OR ABSENCE OF NORMAL INFORMATION, NUMBER, OR LIKE | SELECTION OF BLOCK ACCORDING TO PRESENCE OR ABSENCE OF NORMAL INFORMATION |
| | REFLECTANCE | PRESENCE OR ABSENCE OF REFLECTANCE INFORMATION, NUMBER, OR LIKE | SELECTION OF BLOCK ACCORDING TO PRESENCE OR ABSENCE OF REFLECTANCE INFORMATION |
| OBTAINMENT INFORMATION | TIME | 3D DATA OBTAINMENT PERIOD OR LIKE (TIME, VERSION, OR LIKE) | SELECTION OF BLOCK INCLUDING LATEST DATA OR DATA IN SPECIFIED PERIOD |
| | CALCULATING METHOD | 3D DATA OBTAINING AND CALCULATING METHOD OR LIKE (LiDAR, STEREO MATCHING, OR LIKE) | SELECTION OF BLOCK INCLUDING DATA ABOUT SPECIFIED METHOD |
| | SENSOR | SENSOR TYPE (LiDAR SENSOR, CMOS SENSOR, OR LIKE), PERFORMANCE, NUMBER, USAGE METHOD, OR LIKE | SELECTION OF BLOCK INCLUDING DATA OBTAINED BY SPECIFIED SENSOR |
| | OBTAINMENT POSITION | 3D DATA OBTAINMENT POSITION OR LIKE (GPS OR LIKE) | SELECTION OF BLOCK INCLUDING DATA OBTAINED AT SPECIFIED POSITION |
| | OBTAINER | 3D DATA OBTAINER, RIGHT, OR LIKE | SELECTION OF BLOCK ACCORDING TO SPECIFIED OBTAINER |

FIG. 6

161

| KIND | INFORMATION NAME | DESCRIPTION |
|---|---|---|
| WHOLE REGION INFORMATION | POSITION SIZE | SIZE, COORDINATE, SHAPE, OR LIKE |
| | BLOCK INFORMATION | TYPE, TOTAL NUMBER, NUMBER OF DIVISIONS, OR LIKE |
| | COMMON INFORMATION | MANAGEMENT INFORMATION COMMON TO ALL BLOCKS |

A $B_0(add) = (0, 0, 0), B_0(size) = 10$
$B_1(add) = (10, 0, 0), B_1(size) = 10$
$B_2(add) = (0, 10, 0), B_2(size) = 10$
$B_3(add) = (10, 10, 0), B_3(size) = 10$
$B_4(add) = (5, 5, 5), B_4(size) = 10$

B $B_d(loc) = (5, 5, 0 \ -15, 15, 5)$

C $B_d(loc) = (5, 5, 5 \ -15, 15, 10)$

D $B_d(loc) = (5, 5, 5 \ -10, 10, 10)$

E

IMAGE PROCESSING DEVICE AND METHOD

CROSS REFERENCE TO PRIOR APPLICATION

This application is a divisional of U.S. patent application Ser. No. 17/278,525 (filed on Mar. 22, 2021), which is a National Stage Patent Application of PCT International Patent Application No. PCT/JP2019/036471 (filed on Sep. 18, 2019) under 35 U.S.C. § 371, which claims priority to Japanese Patent Application No. 2018-187489 (filed on Oct. 2, 2018), which are all hereby incorporated by reference in their entirety.

TECHNICAL FIELD

The present disclosure relates to an image processing device and a method, and particularly to an image processing device and a method that enable partial decoding of 3D data to be performed more easily.

BACKGROUND ART

Conventionally, there is coding using an Octree, for example, as a method of coding 3D data representing a three-dimensional structure such as a point cloud (see NPL 1, for example), for example.

An Octree is obtained by converting voxels obtained by quantizing positional information into a tree structure and has dependence relation between nodes. Thus, even in a case of decoding a part of the Octree, it is necessary to cut out a desired region after searching the whole of the Octree and reproducing the configuration of the whole of the Octree. An amount of processing and an amount of usage of resources such as a memory are therefore unnecessarily increased.

Incidentally, in a case of coding a two-dimensional image, there is a method of dividing a frame into slices and tiles with an objective of distributing processing. Also, in the case of 3D data, when a three-dimensional spatial region is divided into small regions and each of the small regions is independently coded as in such slices and tiles, each small region can be independently decoded easily.

CITATION LIST

Non-Patent Literature

[NPL 1]

R. Mekuria, Student Member IEEE, K. Blom, P. Cesar., Member, IEEE, "Design, Implementation and Evaluation of a Point Cloud Codec for Tele-Immersive Video," tcsvt_paper_submitted_february.pdf

SUMMARY

Technical Problems

However, with a method of decoding each small region obtained by dividing the whole of such a region, there is a limitation on the position, shape, size, and the like of each small region. It is therefore difficult to decode a partial region having an optional position, an optional shape, and an optional size independently. In addition, an amount of processing and an amount of usage of resources such as a memory may be unnecessarily increased because of a need to decode 3D data in an unnecessary region or the like.

The present disclosure has been made in view of such circumstances. The present disclosure is to enable partial decoding of 3D data to be performed more easily.

Solution to Problems

An image processing device according to one aspect of the present technology is an image processing device including a management information generating section configured to generate management information of a block as a partial region in a predetermined three-dimensional spatial region including 3D data representing a three-dimensional structure.

An image processing method according to the one aspect of the present technology is an image processing method including generating management information of a block as a partial region in a predetermined three-dimensional spatial region including 3D data representing a three-dimensional structure.

An image processing device according to another aspect of the present technology is an image processing device including a block selecting section configured to select a block satisfying a condition specified by a user on the basis of management information of the block as a partial region in a predetermined three-dimensional spatial region including 3D data representing a three-dimensional structure, and a decoding section configured to decode coded data of the 3D data within the block selected by the block selecting section.

An image processing method according to the other aspect of the present technology is an image processing method including selecting a block satisfying a condition specified by a user on a basis of management information of the block as a partial region in a predetermined three-dimensional spatial region including 3D data representing a three-dimensional structure, and decoding coded data of the 3D data within the selected block.

In the image processing device and the method according to the one aspect of the present technology, management information of a block as a partial region in a predetermined three-dimensional spatial region including 3D data representing a three-dimensional structure is generated.

In the image processing device and the method according to the other aspect of the present technology, a block satisfying a condition specified by a user is selected on the basis of management information of the block as a partial region in a predetermined three-dimensional spatial region including 3D data representing a three-dimensional structure, and coded data of the 3D data within the selected block is decoded.

BRIEF DESCRIPTION OF DRAWINGS

FIG. 4 is a diagram of assistance in explaining an example of contents of management information.

FIG. 6 is a diagram of assistance in explaining an example of whole region information.

DESCRIPTION OF EMBODIMENTS

Figure 1:
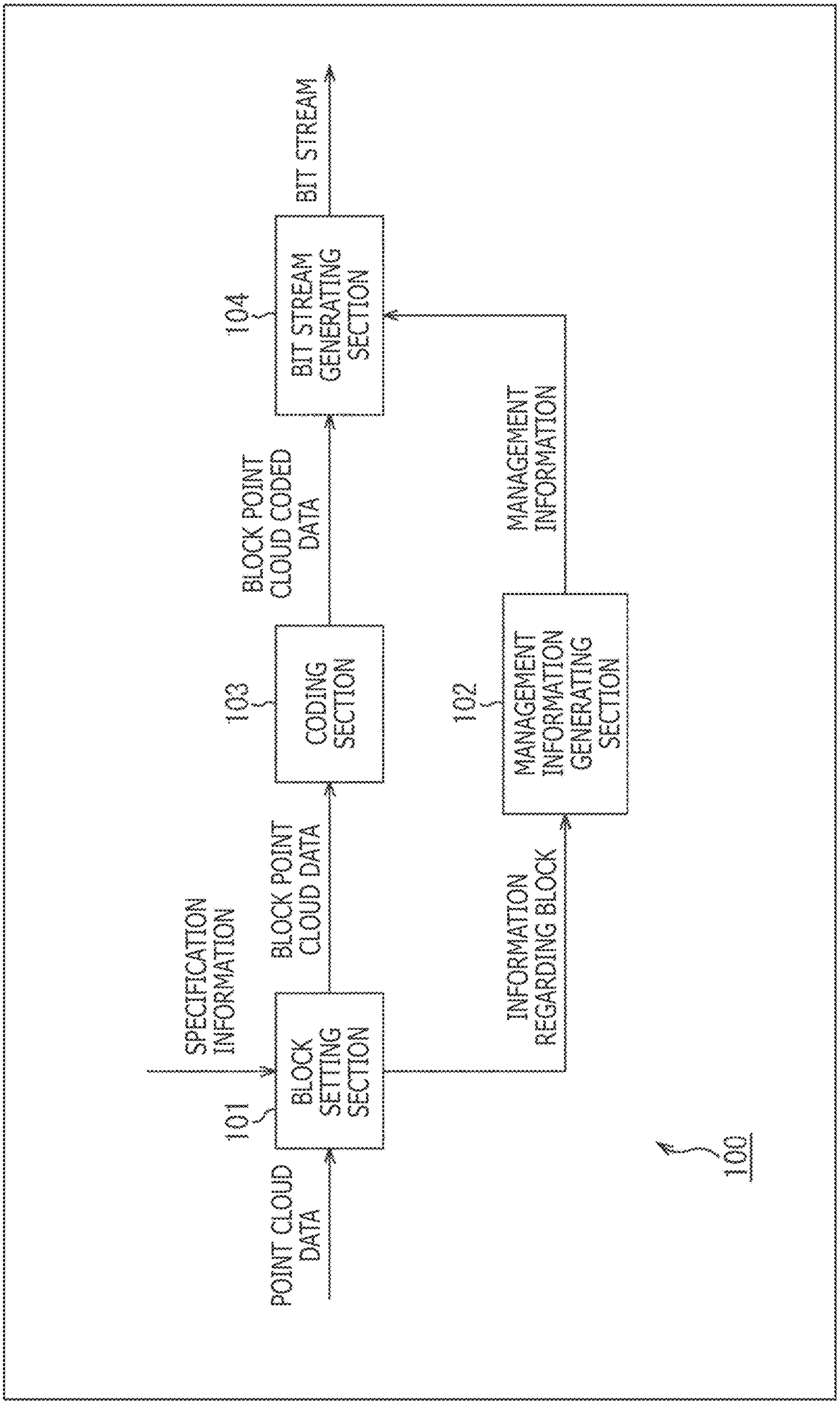
FIG. 1 is a block diagram illustrating an example of a main configuration of a coding device.

Modes for carrying out the present disclosure (which modes will hereinafter be described as embodiments) will hereinafter be described. Incidentally, the description will be made in the following order.

1. First Embodiment (Coding Device)
2. Second Embodiment (Decoding Device)
3. Use Cases
4. Third Embodiment (Coding Device)
5. Fourth Embodiment (Decoding Device)
6. Supplementary Notes

1. FIRST EMBODIMENT

<Literature and Like Supporting Technical Contents and Technical Terms>

The scope disclosed in the present technology includes not only contents described in embodiments but also contents described in the following NPLs publicly known at the time of filing.

NPL 1: (described above)

NPL 2: Ohji Nakagami, Phil Chou, Maja Krivokuca, Khaled Mammou, Robert Cohen, Vladyslav Zakharchenko, Gaelle Martin-Cocher, “Second Working Draft for PCC Categories 1, 3”, ISO/IEC JTC1/SC29/WG11, MPEG 2018/N17533, April 2018, San Diego, US NPL 3: TELECOMMUNICATION STANDARDIZATION SECTOR OF ITU (International Telecommunication Union), “Advanced video coding for generic audiovisual services,” H.264, April 2017

NPL 4: TELECOMMUNICATION STANDARDIZATION SECTOR OF ITU (International Telecommunication Union) “High efficiency video coding,” H.265, December 2016

NPL 5: Jianle Chen, Elena Alshina, Gary J. Sullivan, Jens-Rainer, Jill Boyce, “Algorithm Description of Joint Exploration Test Mo del 4,” JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents described in the above NPLs also form a basis in determining support requirements. For example, a Quad-Tree Block Structure described in NPL 4 and a QTBT (Quad Tree Plus Binary Tree) Block Structure described in NPL 5 are within the disclosed scope of the present technology even in cases where the structures are not directly described in embodiments and are assumed to satisfy support requirements of claims. In addition, for example, technical terms such as parsing, syntax, and semantics are similarly within the disclosed scope of the present technology even in cases where the technical terms are not directly described in embodiments and are assumed to satisfy support requirements of claims.

<Point Cloud>

Conventionally, there is 3D data such as a point cloud representing a three-dimensional structure by positional information, and attribute information of a point group, and a mesh including vertices, edges, and faces and defining a three-dimensional shape using polygonal representation.

In the case of a point cloud, for example, a solid structure (object of a three-dimensional shape) is represented as a set of a large number of points (point group). That is, data of the point cloud (which data is referred to also as point cloud data) includes positional information, attribute information (for example, a color and the like) of each point in this point group. Hence, the data structure is relatively simple, and an optional solid structure can be represented with a sufficient accuracy by using a sufficiently large number of points.

<Quantization of Positional Information Using Voxels>

Because of a relatively large data amount of such point cloud data, a coding method using voxels has been considered in order to compress the data amount by coding or the like. Voxels are three-dimensional regions for quantizing positional information of a coding target. That is, a three-dimensional region including a point cloud is divided into small three-dimensional regions referred to as voxels, and whether or not a point is included is indicated in each voxel. As a result of the above, the position of each point is quantized in voxel units. Hence, an increase in amount of information can be suppressed (typically, the amount of information can be reduced) by converting point cloud data into data of such voxels (which data is referred to also as voxel data).

<Octree>

Further, construction of an Octree using such voxel data has been considered. An Octree is obtained by converting voxel data into a tree structure. Each node of the Octree includes data of 8 bits, and the values of the respective bits indicate the presence or absence of a point in respective 2×2×2 small regions. That is, the Octree recursively divides a three-dimensional region, and indicates the presence or absence of data in each layered small region. Each bit of a node at a lowest position of the Octree indicates the presence or absence of a point in a voxel. The Octree therefore has dependence relation between nodes. Thus, even in a case of decoding a part of the Octree, it is necessary to cut out a desired region after searching the whole of the Octree and reproducing the configuration of the whole of the Octree. An amount of processing and an amount of usage of resources such as a memory are therefore unnecessarily increased.

Incidentally, in a case of coding a two-dimensional image, there is a method of dividing a frame into slices and tiles with an objective of distributing processing. Also, in the case of 3D data, when a three-dimensional spatial region is divided into small regions and each of the small regions is independently coded as in such slices and tiles, each small region can be independently decoded easily.

However, with a method of decoding each small region obtained by dividing the whole of such a region, there is a limitation on the position, shape, size, and the like of each small region. For example, the position, shape, size, and the like of each small region may be determined by the position, shape, size, number of divisions, dividing direction, and the like of the whole of the region. It is therefore difficult to decode a partial region having an optional position, an optional shape, and an optional size independently.

In addition, in the case where decoding is performed in such small region units, small regions including a desired range are all decoded. However, in that case, an amount of processing and an amount of usage of resources such as a memory may be unnecessarily increased because of a need to decode 3D data outside the desired range or the like.

<Signaling of Management Information of Partial Region>

Accordingly, an encoder generates management information of a block as a partial region in a predetermined three-dimensional spatial region including 3D data representing a three-dimensional structure. For example, the encoder (image processing device) is provided with a management information generating section that generates management information of a block as a partial region in a predetermined three-dimensional spatial region including 3D data representing a three-dimensional structure.

Thus, the encoder can set a block having an optional position, an optional shape, and an optional size and generate management information of the block. Then, the encoder can transmit (signal) the management information managing the block to a decoding side. A decoder can therefore more easily decode the 3D data of the block on the basis of the management information. That is, the decoder can decode the 3D data of a partial region having an optional position, an optional shape, and an optional size more easily.

<Coding Device>

FIG. 1 is a block diagram illustrating an example of a configuration of a coding device as one mode of an image processing device to which the present technology is applied. A coding device 100 illustrated in FIG. 1 is a device that codes 3D data such as a point cloud using voxels and an Octree.

Incidentally, FIG. 1 illustrates main processing sections, main data flows, and the like, and not all of processing sections, data flows, and the like are necessarily illustrated in FIG. 1. That is, in the coding device 100, there may be processing sections not illustrated as blocks in FIG. 1, or there may be processing and data flows not represented as arrows or the like in FIG. 1. The same is true also for other figures describing processing sections within the coding device 100 and the like.

As illustrated in FIG. 1, the coding device 100 includes a block setting section 101, a management information generating section 102, a coding section 103, and a bit stream generating section 104.

The block setting section 101 performs processing related to setting of a block as a partial region in a predetermined three-dimensional spatial region including 3D data representing a three-dimensional structure. The three-dimensional spatial region and the block will be described later. The block setting section 101, for example, obtains point cloud data input to the coding device 100.

In addition, the block setting section 101 receives specification information regarding a block, the specification information being input from, for example, a user, a device external to the coding device 100, or the like. The specification information is information specifying what kind of block to set. This specification information specifies the block to be set by using optional parameters such as a position, a size, and a shape, for example.

Further, the block setting section 101 sets the specified block in a three-dimensional spatial region including an input point cloud. In addition, the block setting section 101 extracts a point cloud included in the block from the input point cloud, and supplies data of the point cloud (which data will be referred to also as block point cloud data) to the coding section 103. Further, the block setting section 101 supplies information regarding the set block to the management information generating section 102. In other words, the block setting section 101 sets the block managed by management information generated by the management information generating section 102. Incidentally, the block setting section 101 may further supply information regarding the three-dimensional spatial region including the point cloud to the management information generating section 102.

The management information generating section 102 performs processing related to the generation of the management information of the block. For example, the management information generating section 102 obtains information regarding the block from the block setting section 101. In addition, the management information generating section 102 generates the management information on the basis of the information. That is, the management information generating section 102 generates the management information of the block as a partial region in the predetermined three-dimensional spatial region including the 3D data representing the three-dimensional structure. The management information will be described later. Incidentally, in the case where the information regarding the three-dimensional spatial region including the point cloud (which region will be referred to also as a whole region) is supplied from the block setting section 101, the management information generating section 102 generates the management information using also the information. Further, the management information generating section 102 supplies the generated management information to the bit stream generating section 104.

The coding section 103 performs processing related to coding. For example, the coding section 103 obtains the block point cloud data supplied from the block setting section 101. In addition, the coding section 103 codes the block point cloud data by a predetermined method, and thereby generates the coded data (referred to also as block point cloud coded data). That is, the coding section 103 can code the point cloud data for each block independently. This coding will be described later. Further, the coding section 103 supplies the generated block point cloud coded data to the bit stream generating section 104.

The bit stream generating section 104 performs processing related to generation of a bit stream. For example, the bit stream generating section 104 obtains the management information supplied from the management information generating section 102. In addition, the bit stream generating section 104 obtains the block point cloud coded data supplied from the coding section 103. Further, the bit stream generating section 104 generates a bit stream including the management information and the block point cloud coded data. That is, the bit stream generating section 104 generates the bit stream including the coded data of the point cloud in block units and the management information thereof. This bit stream will be described later. In addition, the bit stream generating section 104 outputs the generated bit stream to the outside of the coding device 100. This bit stream is for example transmitted to the decoder (decoding side) via a predetermined medium (for example, a communication medium, a recording medium, both thereof, or the like).

Incidentally, these processing sections (the block setting section 101, the management information generating section 102, the coding section 103, and the bit stream generating section 104) have an optional configuration. For example, each processing section may include a logic circuit that implements the above-described processing. In addition, each processing section may have, for example, a CPU (Central Processing Unit), a ROM (Read Only Memory), a RAM (Random Access Memory), and the like, and may implement the above-described processing by executing a program using the CPU, the ROM, the RAM, and the like. Needless to say, each processing section may have the configurations of both thereof and implement a part of the above-described processing by a logic circuit and implement the rest by executing a program. The configurations of the respective processing sections may be independent of each other. For example, a part of the processing sections may implement a part of the above-described processing by a logic circuit, another part of the processing sections may implement the above-described processing by executing a program, and yet another processing section may implement the above-described processing by both of a logic circuit and the execution of a program.

<Blocks>

Description will next include blocks. Slices and tiles in the coding of a two-dimensional image are obtained by dividing the whole image. When applied to a three-dimensional space, slices and tiles include setting a three-dimensional spatial region 121 (A OF FIG. 2) including the whole of a point cloud as a processing target and dividing the three-dimensional spatial region 121 representing the three-dimensional spatial region of the processing target into a plurality of regions. In that case, the position, shape, size, and the like of the slices and the tiles depend on the position, shape, size, and the like of the three-dimensional spatial region 121.

In general, the point cloud is not uniformly distributed within the three-dimensional spatial region 121. Thus, the division of the three-dimensional spatial region 121 and the division of the point cloud are not necessarily corresponding to each other. For example, the whole of the point cloud can be included within one slice and tile. In addition, there may be a slice and a tile not including a point. Hence, the method of dividing the three-dimensional spatial region 121 in order to divide the point cloud in such a manner may be inefficient control.

On the other hand, a block is a partial region having an optional position, an optional shape, and an optional size within the three-dimensional spatial region 121. Because the management information generating section 102 generates management information for the block, the block setting section 101 can set the block in an optional position, an optional shape, and an optional size.

Blocks can be set in an optional region. Thus, for example, as with slices and tiles, blocks can be formed so as to be arranged adjacent to each other over the whole of the three-dimensional spatial region 121. In a case of B OF FIG. 2, blocks 122 are arranged so as to be adjacent to each other, and are arranged so as to fill the whole of the three-dimensional spatial region 121. Then, as in the case of slices and tiles, the blocks 122 can form partial regions obtained by dividing the three-dimensional spatial region 121.

In other words, in this case, the three-dimensional spatial region 121 includes arranging the blocks 122. Hence, the three-dimensional spatial region 121 including the whole of the point cloud can be easily set in an optional shape. For example, in the case of B OF FIG. 2, blocks 122 in parts where there is no point can be omitted (not formed), as in parts indicated by an arrow 123 and an arrow 124. Thus, not only a rectangular three-dimensional spatial region 121 as in A OF FIG. 2 but also a three-dimensional spatial region 121 of a more complex shape can be formed more easily.

In addition, the whole of the three-dimensional spatial region 121 does not need to be filled with blocks. For example, in a case of C OF FIG. 2, a block 125 and a block 126 are formed in the three-dimensional spatial region 121, while there are no blocks in another region.

Further, a block can be set so as to overlap the region of another block. For example, in a case of an example of D OF FIG. 2, the regions of a block 127 and a block 128 partly overlap each other (gray part). In addition, the block 128 includes a block 129.

As described above, an appropriate block can be formed only in a necessary part. Hence, the formation of an unnecessary block can be suppressed. It is therefore possible to suppress an increase in an unnecessary amount of information and suppress a decrease in coding efficiency. In addition, an increase in the loads of coding and decoding can be suppressed.

In addition, information can be managed for each block by management information. For example, a resolution, a compression ratio, or the like can be managed for each block. Because a plurality of blocks can be set in a same region, it is possible, for example, to realize scalability for a parameter managed by such management information. For example, when blocks having values different from each other for an optional parameter such as a resolution or a compression ratio are set to a same region, a value of the parameter can be selected by block selection. That is, scalability for the parameter can be realized.

In addition, information such as a data update date and time, or a degree of reliability can also be managed for each block. Because a block can be set in an optional position, an optional shape, and an optional size only in a desired range, the block including only update information can be set. It is thereby possible to update the point cloud (replacement, addition, deletion, or the like of information) in block units. In addition, because a block can be set in an optional position, an optional shape, and an optional size, the block can be set so as to exclude unnecessary regions as much as possible. That is, an increase in an amount of additional data and an increase in the load of processing thereof can be suppressed. In addition, even when the decoder is performing decoding processing (data access) as appropriate, data can be updated by minimum exclusive processing.

In addition, a block size as a partial region is smaller than the size of the three-dimensional spatial region 121 as the whole region. Therefore, in a case of decoding a block, an amount of memory (amount of usage of resources) necessary at a time of coding can be reduced as compared with a case of coding the three-dimensional spatial region 121.

In addition, because each block can be coded independently, parallelization of coding processing can be achieved easily. In that case, because a block can be set in an optional position, an optional shape, and an optional size, distribution of a load of the coding processing can be performed more appropriately (made more approximate to a desired distributing method).

In addition, because the coding processing is independently performed for each block, the update of the point cloud (replacement, addition, deletion, or the like of information) can be performed in block units. For example, when a new block is formed in an update part of information, the update information can be coded and decoded independently, and therefore the data of the update information can be added to data before the update more easily.

In addition, because coding is independently performed for each block, the data of respective blocks is independent of each other in the bit stream. Therefore, at a time of decoding, it is only required to decode only a block including a desired region. Hence, an increase in the load of decoding processing can be suppressed. For example, the processing time of the decoding processing can be reduced. In addition, for example, an amount of usage of resources such as an amount of occupied memory can be reduced.

In addition, in a case where there is a plurality of blocks including a same region, decoding efficiency can be improved by selecting a necessary block on the basis of the management information. For example, in a case where a necessary resolution is known, the decoder can obtain a decoding result with a desired resolution easily by selecting and decoding a block including up to the resolution. In addition, in a case where an update time is known, the decoder can obtain a decoding result of latest information easily by selecting and decoding a newer block. Further, the decoder can select and decode a block on the basis of an optional parameter such as the presence or absence of color information, and can obtain more various processing results.

Figure 2:
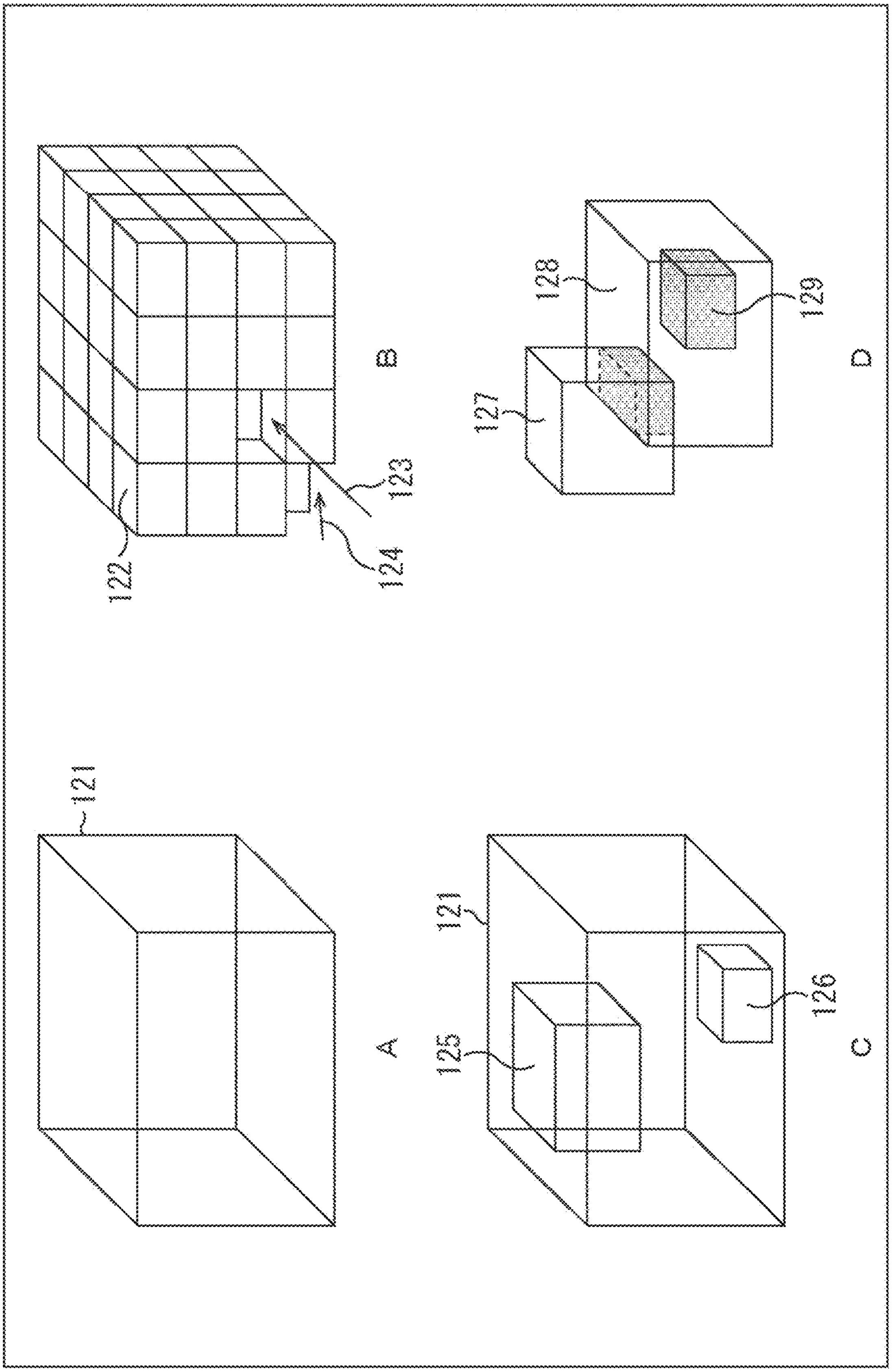
FIG. 2 is a diagram of assistance in explaining an example of blocks.

In addition, as in the example of D OF FIG. 2, plural blocks can be set such that the regions thereof overlap each other. In a case of a two-dimensional image, for example, when regions thus overlap, overlap parts of the data of the respective regions are redundant. That is, in the case of a two-dimensional image, information necessary at a same address is always one piece of information. Hence, in the case where the regions overlap, a point in one of the regions is selected.

However, in the case of the point cloud as 3D data, the meaning of data overlap differs. In the case of the point cloud, data is not present at all of lattice points within a data expression region (voxel rectangular parallelepiped). In addition, two or more points (representations thereof) at a same position address can be present (a method of using the plurality of points depends on an application).

Hence, in a case where the regions of plural blocks overlap each other, the data of any one block can be selected, or the data of plural blocks can be selected (the data of all of the blocks whose regions overlap each other can be selected).

For example, even when two blocks are set to a same region, the positions of points included in the respective blocks may not coincide with each other. In such a case, for example, at a time of decoding, the data of one block (points of one block) may be selected and decoded, or the data of both of the blocks (points of both of the blocks) may be selected and decoded. In the case where both of the blocks are selected, all of the points included in both of the blocks may be restored, or new points may be generated by integrating the points of the blocks with each other by operation.

In addition, even when the positions of points included in two blocks set to a same region coincide with each other, the attribute information of the respective points may be different from each other. In such a case, for example, at a time of decoding, the attribute information of one block (points of one block) may be selected and decoded, or the attribute information of both of the blocks (points of both of the blocks) may be selected and decoded. In the case where both of the blocks are selected, all of the attribute information included in both of the blocks may be restored, or new attribute information may be generated by integrating the attribute information of the blocks with each other by operation.

Further, even when the positions of points included in two blocks set to a same region coincide with each other, the points may be different from each other in a parameter managed by the management information. In such a case, for example, at a time of decoding, one of the blocks (points of one of the blocks) may be selected and decoded on the basis of the parameter, or both of the blocks (points of both of the blocks) may be selected and decoded. In the case where both of the blocks are selected, the parameter may be updated.

<Bit Stream>

The bit stream will next be described. The coding device 100, for example, generates a bit stream having a data structure as illustrated in A OF FIG. 3. In A OF FIG. 3, the bit stream 141 is a bit stream generated by the coding device 100. The bit stream 141 has a start code (start_code), a sequence header (Seq_Header_info), and block data (Block_data (0), Block_data (1), . . . , Block_data (n)).

The start code (start_code) is identification information indicating a start position of a sequence in question. A predetermined bit string is set in the start_code (start_code). The sequence header (Seq_Header_info) is header information for each sequence. Information regarding the sequence in question is stored in the sequence header (Seq_Header_info). The data of each block is stored in the block data (Block_data (0), Block_data (1), . . . , Block_data (n)).

Figure 3:
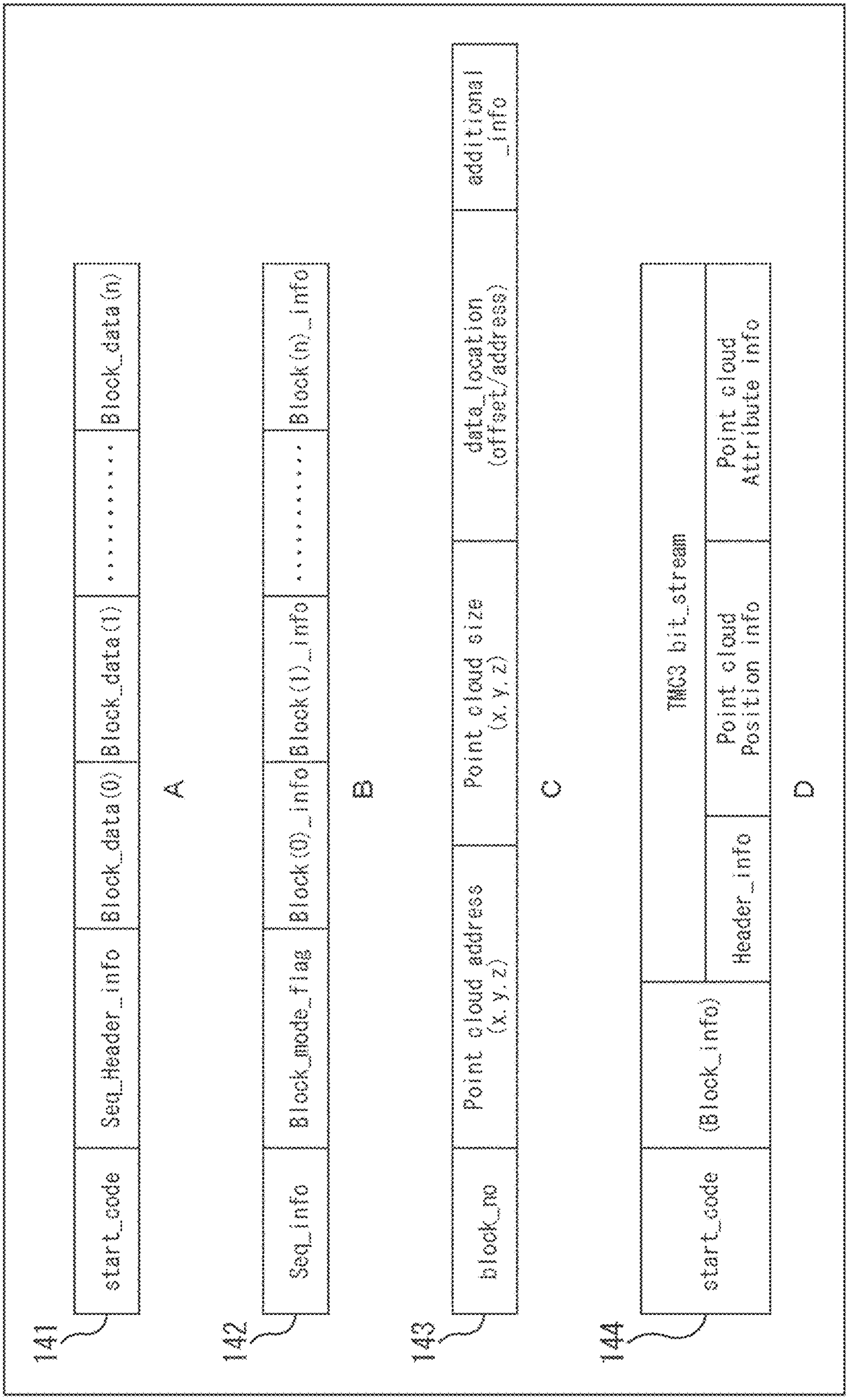
FIG. 3 is a diagram of assistance in explaining an example of a structure of a bit stream.

The sequence header (Seq_Header_info), for example, has a data structure as illustrated in B OF FIG. 3. In B OF FIG. 3, the sequence header 142 has sequence information (Seq_info), a block mode flag (Block_mode_flag), and the block information of each block (Block (0)_info, . . . , Block (n)_info).

Information regarding the sequence in question is stored in the sequence information (Seq_info). The block mode flag (Block_mode_flag) is flag information indicating whether or not blocks are set in the sequence in question (that is, whether or not a block mode is set). By referring to this value, it is possible to easily grasp whether or not blocks are set in the sequence in question. In the block information (Block (0)_info, . . . , Block (n)_info), information regarding the corresponding blocks is stored.

The block information (Block (0) info, . . . , Block (n)_info), for example, has a data structure as illustrated in C OF FIG. 3. In B OF FIG. 3, the block information 143 has a block number (block_no), a point cloud address (Point cloud address (x, y, z)), a point cloud size (Point cloud size (x, y, z)), a data location (data_location (offset/address)), and additional information (additional_info).

The block number (block_no) is a number (identification information) for identifying a block in question. The point cloud address (Point cloud address (x, y, z)) is positional information (x, y, z) of the block in question. The point cloud size (Point cloud size (x, y, z)) is size information of the block in question. The data location (data_location (offset/address)) is positional information of the data of the block in question in the bit stream. This positional information, for example, indicates a start position of the data of the block in question. An offset from a predetermined reference position in the bit stream or an address, for example, is stored in the data location (data_location (offset/address)). Optional information regarding the block other than the foregoing is stored in the additional information (additional_info).

The block data (Block_data (0), Block_data (1), . . . , Block_data (n)), for example, has a data structure as illustrated in D OF FIG. 3. In D OF FIG. 3, the block data 144 has a start code (start_code), header information (Header_info), point cloud positional information (Point cloud Position info), and point cloud attribute information (Point cloud Attribute info). In addition, the block data 144 can also optionally have block information (Block_info) of the block in question.

The start_code (start_code) is identification information indicating a start position of the block in question. A predetermined bit string is set in the start_code (start_code). The header information (Header_info) is header information for each block. Information regarding the block in question is stored in the header information (Header_info). The positional information of a point cloud included in the block in question is stored in the point cloud positional information (Point cloud Position info). The attribute information of the point cloud included in the block in question is stored in the point cloud attribute information (Point cloud Attribute info). Information similar to the block information 143 is stored in the block information (Block_info).

The bit stream generating section 104 can store the management information generated by the management information generating section 102 (management information for managing the blocks) in an optional position of such a bit stream. This management information may, for example, be stored in the sequence information (Seq_info) of the sequence header 142. In addition, this management information may be divided for each block, and stored in the additional information (additional_info) of the block information 143. Further, this management information may be divided for each block, and stored in the block information (Block_info) of the block data 144. In addition, the management information may be added as a layer concept at an even higher level to the bit stream 141.

<Management Information>

The management information generated by the management information generating section 102 will next be described. The management information can include specific region information of each block, and further include additional information (resolution and the like). For example, the management information can include various kinds of information as illustrated in a table 151 of FIG. 4.

For example, the management information stores block information as information regarding a block. In addition, the management information may include point information as information regarding the positional information of 3D data (for example, a point cloud) included in the block. Further, the management information may include attribute information as information regarding the attribute information of the 3D data (for example, the point cloud) included in the block. In addition, the management information may include obtainment information as information regarding obtainment (generation) of the 3D data (for example, the point cloud).

<Block Information>

The block information is essential information. The block information includes at least any one of pieces of information such as block identification information, a block position, a block size, or a data position as illustrated in the table 151 of FIG. 4, for example. Needless to say, it suffices for the block information to be information regarding the block, and the block information may include information other than the above-described information.

The block identification information is information for identifying the block. The block identification information includes, for example, by an identification number, an index, or the like. By transmitting this block identification information to the decoding side, the coding device 100 can enable the decoder to identify the block more easily by referring to the block identification information.

The block position is information indicating the position of the block in the three-dimensional space in which the point cloud is present. The block position is, for example, indicated by using World coordinates. Needless to say, the method of representing the block position is optional and is not limited to the World coordinates.

Figure 5:
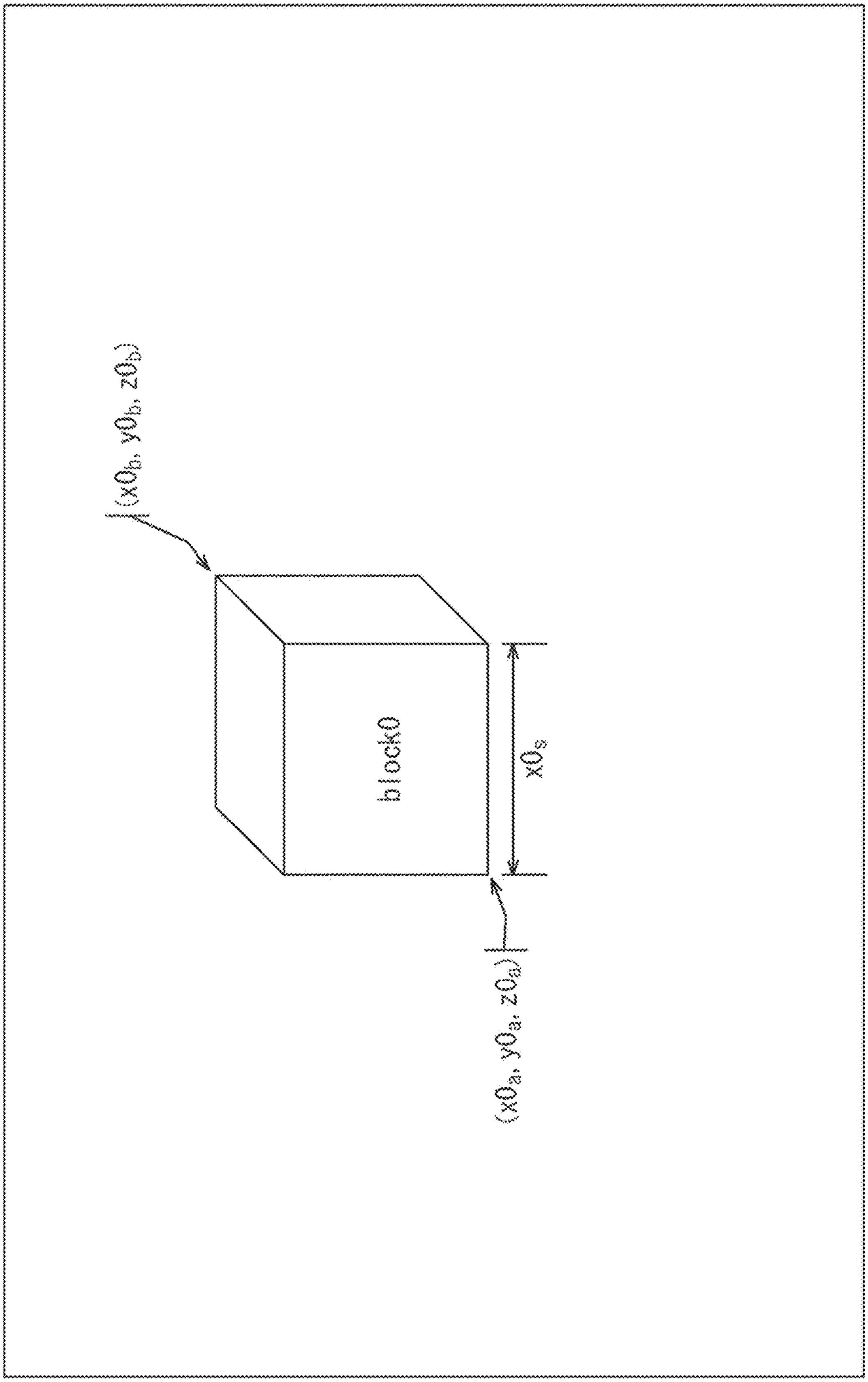
FIG. 5 is a diagram of assistance in explaining an example of block information.

The block size is information indicating the size, shape, and the like of the block. A method of representing the size and shape of the block is optional. In a case of a rectangular block 0 (block0) as illustrated in FIG. 5, for example, the size of the block may be represented by the length of each side such as $x0_s$, or the size of the block may be represented by vertex coordinates such as ($x0_a$, $y0_a$, $z0_a$) and ($x0_b$, $y0_b$, $z0_b$). In this case, the size of the block is represented by identifying the range of the region of the block 0 by the coordinates of two vertices located at diagonal positions.

By transmitting the block position and the block size to the decoding side, the coding device 100 can enable the decoder to more easily make a block selection based on a specified range, for example, on the basis of these pieces of information.

The data position is information indicating the position of the data of the block in question in the bit stream. A method of representing the data position is optional. For example, the data position may be indicated by an offset, an address, or the like.

Incidentally, this information may be included as header information other than the management information in the bit stream.

By transmitting this data position to the decoding side, the coding device 100 can enable the decoder to more easily extract the data of the selected block from the bit stream on the basis of this information.

<Point Information>

The point information, for example, includes at least any one of pieces of information such as a resolution, a structure, or a degree of reliability as illustrated in the table 151 of FIG. 4.

The resolution is information indicating the resolution of 3D data within the block (for example, intervals between points in the case of the point cloud). A method of representing this resolution is optional. The resolution may be represented by a direct numerical value, or the resolution may be represented indirectly by using an index or the like. In addition, in a case where the resolution is not uniform within the block, a minimum value of the resolution (minimum value of distances between points in the case of the point cloud) may be used, a maximum value (maximum value of the distances between the points in the case of the point cloud) may be used, or an average value (average value of the distances between the points in the case of the point cloud), a median value (median value of the distances between the points in the case of the point cloud), or the like may be used.

By transmitting this resolution to the decoding side, the coding device 100 can enable the decoder to more easily make a block selection according to a necessary resolution, for example, on the basis of this information. For example, scalability for the parameter "resolution" (which scalability will be referred to also as resolution scalability) can be realized.

The structure is information describing a solid structure represented by the 3D data (for example, the point cloud) within the block. For example, the structure may be directly expressed by using text such as a natural object, an artificial object, a moving object, a stationary object, an animal, a plant, a human, a hand, a foot, a head, or a hair, or may be indirectly expressed by using an index defined in advance or the like. Alternatively, a characteristic of the solid structure, such as soft, hard, large, or small, may be expressed.

By transmitting this structure to the decoding side, the coding device 100 can enable the decoder to more easily make a block selection according to a specification of the solid structure, for example, on the basis of this information.

The degree of reliability is information indicating a degree of reliability as data of the 3D data (for example, the point cloud) within the block. The degree of reliability, for example, represents a possibility of errors according to conditions at a time of data creation, a degradation due to an update, or the like. A method of representing the degree of reliability is optional. For example, the degree of reliability may be represented by an absolute value or may be represented by a relative value. In addition, besides direct representations such as the foregoing, the degree of reliability may, for example, be indirectly represented by using an index defined in advance or the like.

By transmitting this degree of reliability to the decoding side, the coding device 100 can enable the decoder to more easily make a block selection according to a necessary degree of reliability, for example, on the basis of this information. For example, scalability for the parameter "degree of reliability" (which scalability will be referred to also as reliability degree scalability) can be realized.

Incidentally, the point information is not essential, and can therefore be omitted. That is, a part or all of the above-described information may be omitted. In addition, it suffices for the point information to be information regarding the positional information of the point cloud included in the block, and the point information is not limited to the above-described information example. For example, information other than the above-described information may be included.

<Attribute Information>

The attribute information includes at least any of pieces of information such as a color, a normal, or a reflectance as illustrated in the table 151 of FIG. 4, for example.

The color is flag information indicating whether or not the attribute information of the point cloud present within the block includes color information. In addition, in a case where the color information is included, the number of colors of the color information, what color is used, or the like may be further indicated.

By transmitting this color to the decoding side, the coding device 100 can enable the decoder to more easily make a block selection according to the presence or absence of color information, for example, on the basis of this information.

The normal is flag information indicating whether or not the attribute information of the point cloud present within the block includes normal information. In addition, in a case where the normal information is included, the number and directions of normals of the normal information or the like may be further indicated.

By transmitting this normal to the decoding side, the coding device 100 can enable the decoder to more easily make a block selection according to the presence or absence of normal information, for example, on the basis of this information.

The reflectance is flag information indicating whether or not the attribute information of the point cloud present within the block includes reflectance information. In addition, in a case where the reflectance information is included, the number and values of reflectances of the reflectance information or the like may be further indicated.

By transmitting this reflectance to the decoding side, the coding device 100 can enable the decoder to more easily make a block selection according to the presence or absence of reflectance information, for example, on the basis of this information.

The attribute information is not essential and can therefore be omitted. That is, a part or all of the above-described information may be omitted. In addition, it suffices for the attribute information to be information regarding the attribute information of the point cloud included in the block, and the attribute information is not limited to the above-described information example. For example, information other than the above-described information may be included.

<Obtainment Information>

The obtainment information includes at least any one of pieces of information such as a time, a calculating method, a sensor, an obtainment position, or an obtainer as illustrated in the table 151 of FIG. 4, for example.

The time is information indicating a period of obtaining (generating) the 3D data (for example, the point cloud) present within the block. The time may be directly indicated by time. In that case, the unit is optional, such as years, months, days, hours, minutes, or seconds. In addition, the time may be represented by a time from a reference time (for example, an obtainment time) to a present time. Further, the time may be indirectly represented by using information other than a time or a time period, the information being, for example, a version, the number of updates, or the like.

By transmitting this time to the decoding side, the coding device 100 can enable the decoder to more easily make a selection of a block including latest data or data in a specified article, for example, on the basis of this information.

The calculating method is information indicating a method of obtaining (generating) the 3D data (for example, the point cloud) present within the block. The calculating method represents how the 3D data is obtained (generated) from a solid structure, for example, representing that the 3D data is generated from LiDAR (Light Detection and Ranging) data, or that the 3D data is calculated by a stereo matching method. Further, a calculation equation used in the obtainment (generation), the value of a parameter, or the like may be represented. The method may be directly represented by text or the like, or the method may be indirectly represented by using an index defined in advance or the like.

By transmitting this calculating method to the decoding side, the coding device 100 can enable the decoder to more easily make a selection of a block including data about a specified method, for example, on the basis of this information.

The sensor is information regarding a sensor used in obtaining (generating) the 3D data (for example, the point cloud) present within the block. The sensor, for example, indicates a sensor type (for example, a LiDAR sensor, a CMOS (Complementary Metal Oxide Semiconductor) sensor, or the like), performance (resolution, frequency, or the like), a number, a usage method, or the like. The sensor may be directly indicated or may be indirectly represented by using an index or the like.

By transmitting this sensor to the decoding side, the coding device 100 can enable the decoder to more easily make a selection of a block including data obtained by a specified sensor, for example, on the basis of this information.

The obtainment position is information indicating an obtainment (generation) position of the 3D data (for example, the point cloud) present within the block. A method of representing the obtainment position is optional. For example, the obtainment position may be represented by using GPS data. In addition, the obtainment position may be represented by a country name or a region name such as Japan, the United States of America, or Europe, for example. Further, the obtainment position may be represented by using an address, a zip code, or the like. Needless to say, the obtainment position may be represented by using information other than the foregoing.

By transmitting this obtainment position to the decoding side, the coding device 100 can enable the decoder to more easily make a selection of a block including data obtained at a specified position, for example, on the basis of this information.

The obtainer is information indicating a user (obtainer) who obtained (generated) the 3D data (for example, the point cloud) present within the block. A method of representing the obtainer is optional. For example, the obtainer may be represented by the name of a person, a job title, or the like. In addition, the obtainer may be indirectly represented by using an index defined in advance or the like. Further, a right of the obtainer (an administrator, an ordinary user, a guest, or the like) may be represented.

By transmitting this obtainer to the decoding side, the coding device 100 can enable the decoder to more easily make a selection of a block including data obtained by a specified obtainer, for example, on the basis of this information.

The obtainment information is not essential and can therefore be omitted. That is, a part or all of the above-described information may be omitted. In addition, it suffices for the obtainment information to be information regarding the obtainment of the point cloud included in the block, and the obtainment information is not limited to the above-described information example. For example, information other than the above-described information may be included.

<Whole Region Information>

In addition, the management information may include whole region information as information regarding the whole of the three-dimensional spatial region (referred to also as the whole region) including the whole of the point cloud.

The whole region information includes at least any one of pieces of information such as position size, block information, or common information as illustrated in a table 161 of FIG. 6, for example.

The position size is information indicating the size, position (coordinate), shape, and the like of the whole region. As in the cases of the block position and the block size described above, a method of representing these is optional. For example, the position, the shape, the size, and the like may be represented by using World coordinates. In addition, the size and the shape may be represented by using the length of each side.

The block information is information regarding blocks included in the whole region, the information being a block type, a total number of blocks, the number of divisions, and the like. A method of representing these is optional. The block information may be directly represented by using text or a numerical value or may be indirectly represented by using an index defined in advance or the like.

The common information is management information common to all of the blocks formed in the whole region. The common information may include any content information. The information included in the common information is applied to all of the blocks.

<Coding Unit>

Figure 7:
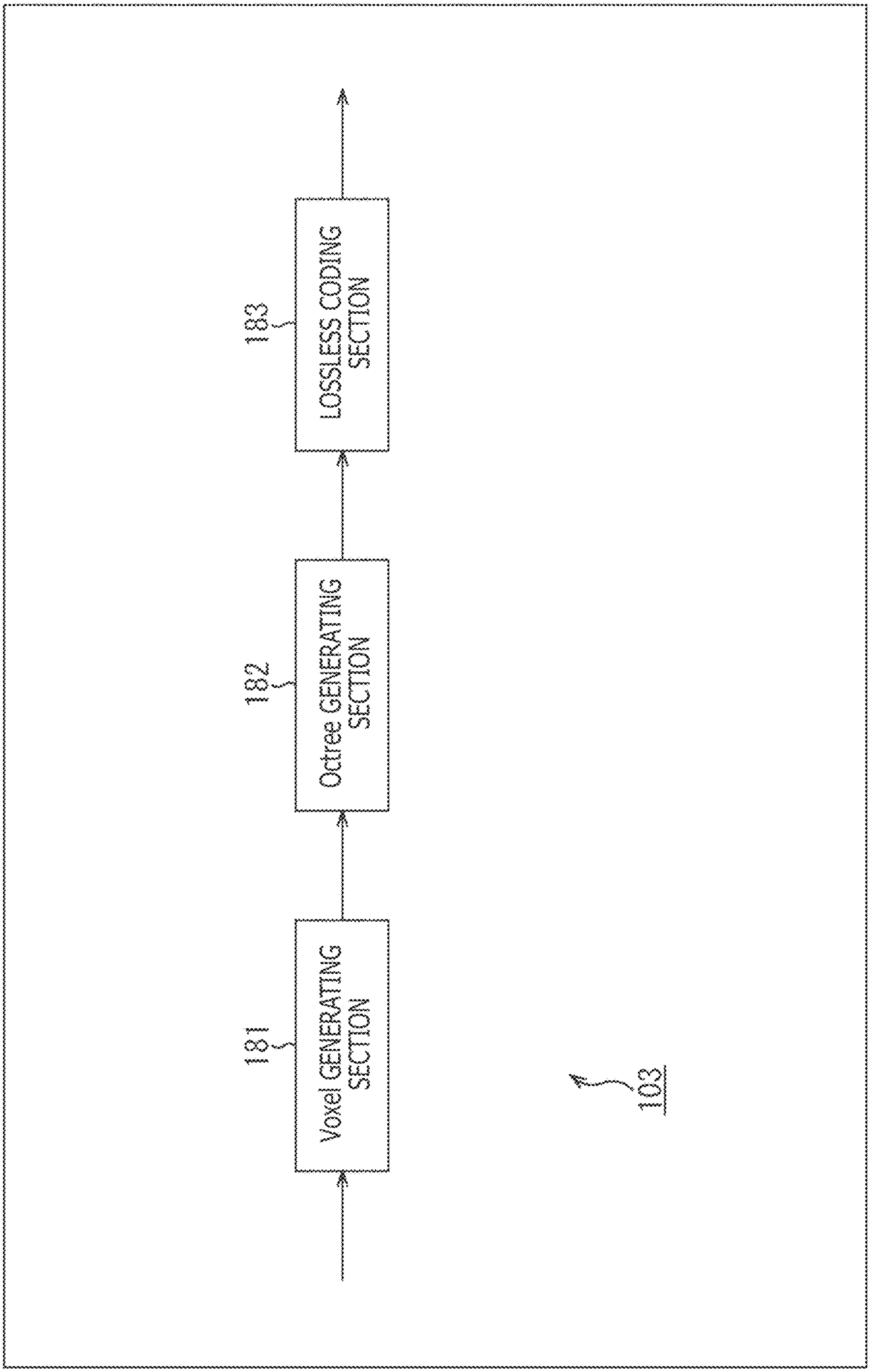
FIG. 7 is a block diagram illustrating an example of a main configuration of a coding section.

FIG. 7 is a block diagram illustrating an example of a main configuration of the coding section 103 (FIG. 1). As illustrated in FIG. 7, the coding section 103 includes a Voxel generating section 181, an Octree generating section 182, and a lossless coding section 183.

The Voxel generating section 181 performs processing related to generation of voxels. For example, the Voxel generating section 181 obtains block point cloud data supplied from the block setting section 101. In addition, the Voxel generating section 181 sets a bounding box to a region including the obtained block point cloud data and sets voxels by further dividing the bounding box. The Voxel generating section 181 thereby quantizes the positional information of the block point cloud data. The Voxel generating section 181 supplies thus generated voxel data (referred to also as block voxel data) to the Octree generating section 182.

The Octree generating section 182 performs processing related to generation of an Octree. For example, the Octree generating section 182 obtains the block voxel data supplied from the Voxel generating section 181. In addition, the Octree generating section 182 generates an Octree (referred to also as a block Octree) from the block voxel data. The Octree generating section 182 supplies the data of the generated block Octree (which data will be referred to also as block Octree data) to the lossless coding section 183.

The lossless coding section 183 performs processing related to lossless coding. For example, the lossless coding section 183 obtains the block Octree data supplied from the Octree generating section 182. The lossless coding section 183 generates coded data by coding the block Octree data. The lossless coding section 183 supplies the generated coded data as block point cloud coded data to the bit stream generating section 104.

Incidentally, these processing sections (the Voxel generating section 181, the Octree generating section 182, and the lossless coding section 183) have an optional configuration. For example, each processing section may include a logic circuit that implements the above-described processing. In addition, each processing section may have, for example, a CPU, a ROM, a RAM, and the like, and may implement the above-described processing by executing a program using the CPU, the ROM, the RAM, and the like. Needless to say, each processing section may have the configurations of both thereof and implement a part of the above-described processing by a logic circuit and implement the rest by executing a program. The configurations of the respective processing sections may be independent of each other. For example, a part of the processing sections may implement a part of the above-described processing by a logic circuit, another part of the processing sections may implement the above-described processing by executing a program, and yet another processing section may implement the above-described processing by both of a logic circuit and the execution of a program.

By having a configuration as described above, the coding device 100 can set a block in an optional size and an optional shape at an optional position and generate the management information of the block. Hence, the coding device 100 can enable the decoder to perform partial decoding of the 3D data more easily.

<Flow of Coding Processing>

An example of a flow of coding processing performed by the coding device 100 will next be described with reference to a flowchart of FIG. 8.

When the coding processing is started, the block setting section 101 obtains point cloud data in step S101.

In step S102, the block setting section 101 receives specification information specifying conditions for a block to be set (for example, conditions with regard to a position, a size, a shape, and other parameters or the like).

In step S103, the block setting section 101 sets a block satisfying the conditions indicated in the specification information on the basis of the specification information.

In step S104, the management information generating section 102 generates management information managing the block set in step S103. That is, the management information generating section 102 generates the management information of the block as a partial region in a predetermined three-dimensional spatial region including 3D data representing a three-dimensional structure.

In step S105, the coding section 103 performs block coding processing. The coding section 103 thereby codes the data of the block set in step S103 (block point cloud data) and generates block point cloud coded data.

In step S106, the bit stream generating section 104 generates a bit stream including the management information generated in step S104 and the block point cloud coded data generated in step S105.

In step S107, the bit stream generating section 104 outputs the bit stream generated in step S106 to the outside of the coding device 100 (transmits the bit stream to the decoding side).

When the processing of step S107 is ended, the coding processing is ended.

<Flow of Block Coding Processing>

An example of a flow of the block coding processing performed in step S105 in FIG. 8 will next be described with reference to a flowchart of FIG. 9.

When the block coding processing is started, the Voxel generating section 181 selects a processing target block from among unprocessed blocks in step S121.

In step S122, the Voxel generating section 181 generates Voxel data by quantizing the positional information of points included in the processing target block (conversion into Voxels) using the block point cloud data of the processing target block.

In step S123, the Octree generating section 182 generates an Octree (block Octree) of the processing target block from the block voxel data generated in step S122.

In step S124, the lossless coding section 183 generates block point cloud coded data by coding the Octree data of the processing target block which Octree data is generated in step S123.

In step S125, the coding section 103 determines whether or not all of set blocks are processed. In a case where it is determined that there is an unprocessed block, the processing returns to step S121 to repeat the processing from step S121 on down.

Figure 8:
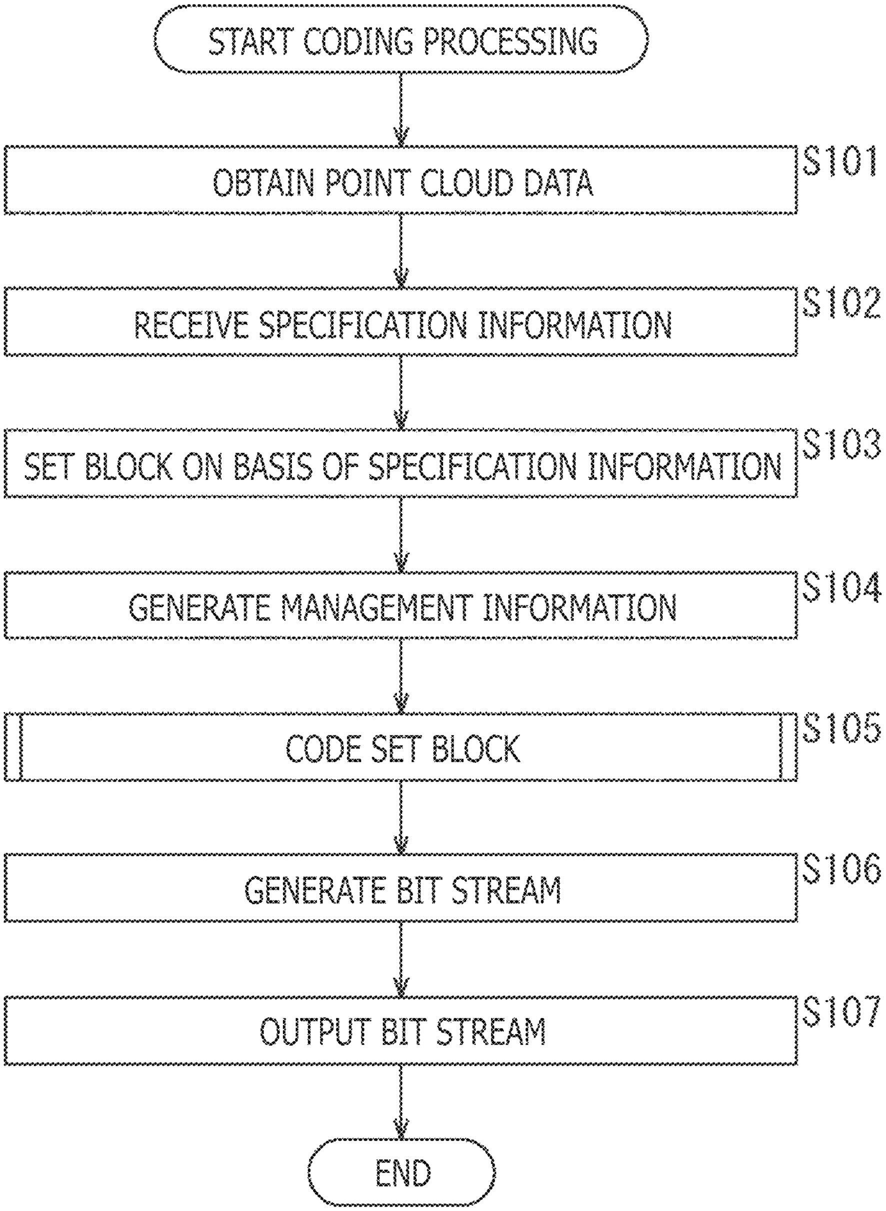
FIG. 8 is a flowchart of assistance in explaining an example of a flow of coding processing.
Figure 9:
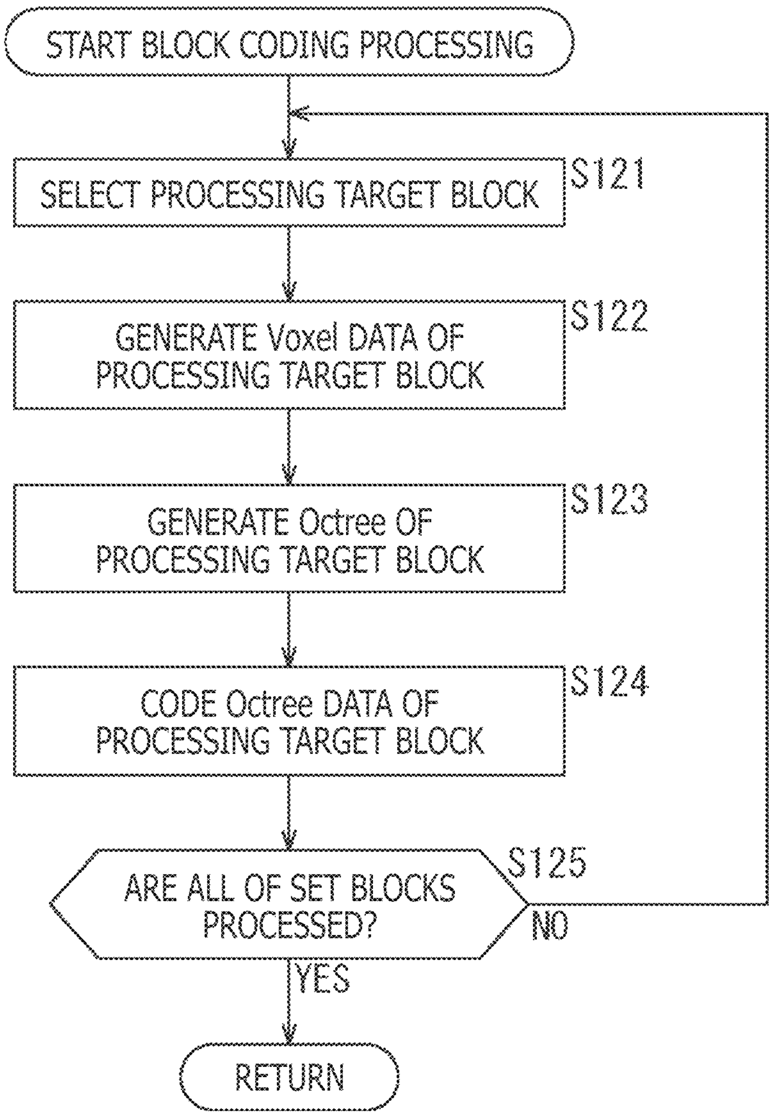
FIG. 9 is a flowchart of assistance in explaining an example of a flow of block coding processing.

In addition, in a case where it is determined in step S125 that all of the blocks are processed, the block coding processing is ended, and the processing returns to FIG. 8.

By performing each piece of processing as described above, the coding device 100 can set a block in an optional size and an optional shape at an optional position and generate the management information of the block. Hence, the coding device 100 can enable the decoder to perform partial decoding of the 3D data more easily.

2. SECOND EMBODIMENT

<Decoding Device>

Figure 10:
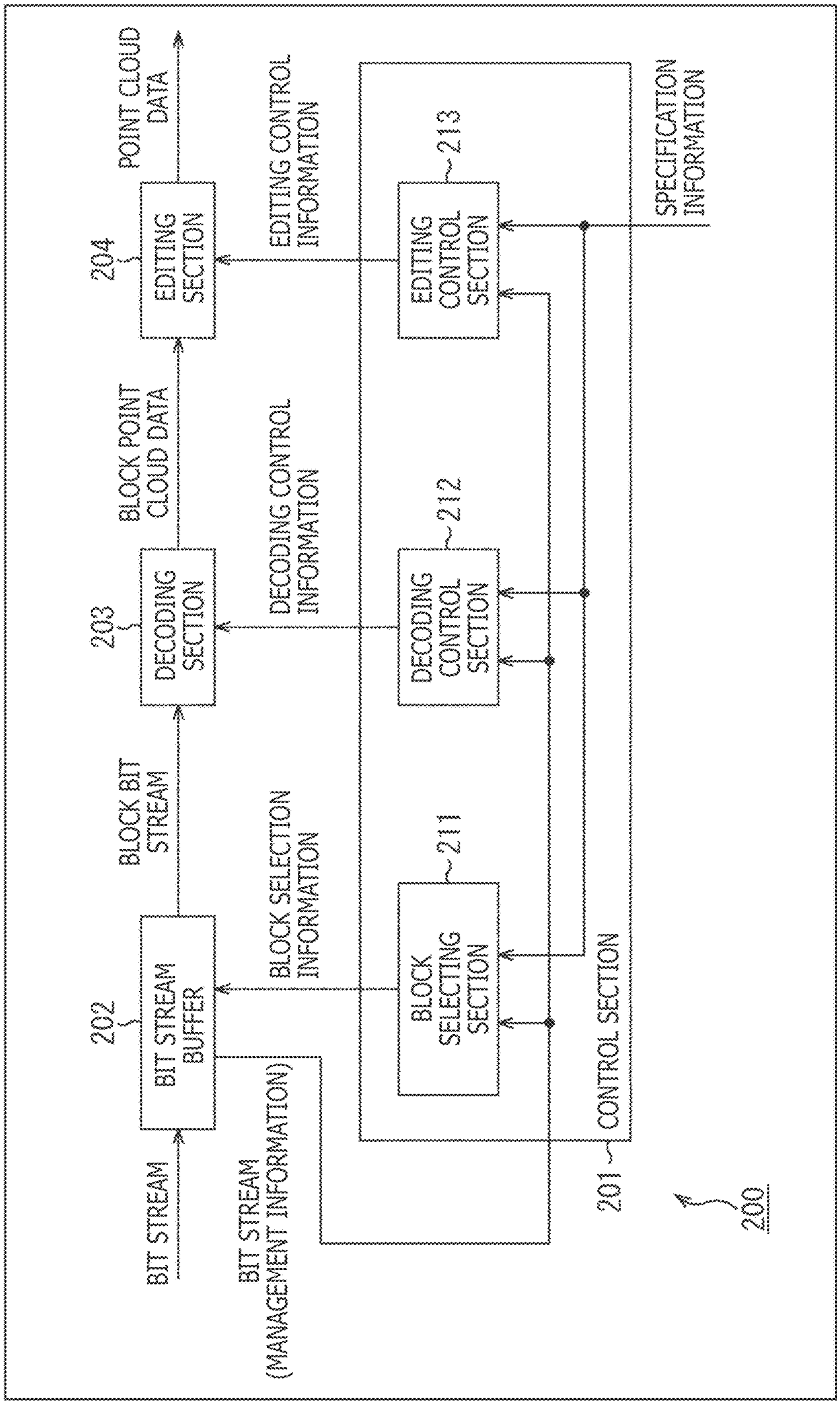
FIG. 10 is a block diagram illustrating an example of a main configuration of a decoding device.

FIG. 10 is a block diagram illustrating an example of a configuration of a decoding device as one mode of the image processing device to which the present technology is applied. A decoding device 200 illustrated in FIG. 10 is a decoding device corresponding to the coding device 100 of FIG. 1 and is a device that reconstructs 3D data by decoding the coded data (bit stream) of the 3D data (for example, a point cloud) generated by the coding device 100, for example.

Incidentally, FIG. 10 illustrates main processing sections, main data flows, and the like, and not all of processing sections, data flows, and the like are necessarily illustrated in FIG. 10. That is, in the decoding device 200, there may be processing sections not illustrated as blocks in FIG. 10, or there may be processing and data flows not represented as arrows or the like in FIG. 10. The same is true also for other figures describing processing sections within the decoding device 200 and the like.

As illustrated in FIG. 10, the decoding device 200 includes a control section 201, a bit stream buffer 202, a decoding section 203, and an editing section 204.

The control section 201 performs processing related to control of decoding. For example, the control section 201 obtains a bit stream supplied from the bit stream buffer 202. The control section 201 extracts management information included in the obtained bit stream. Incidentally, only the management information extracted from the bit stream may be supplied from the bit stream buffer 202. In that case, the control section 201 obtains the management information.

In addition, the control section 201 receives specification information input to the decoding device 200 by a user. The specification information is information set by the user and specifying a condition related to selection of a block to be decoded. For example, for a certain parameter included in the management information, a condition for selecting a block is specified by the specification information.

The control section 201 controls the bit stream buffer 202 to the editing section 204 as appropriate on the basis of those pieces of information. The control section 201, for example, includes a block selecting section 211, a decoding control section 212, and an editing control section 213.

The block selecting section 211 performs processing related to selection of a block to be decoded. For example, the block selecting section 211 extracts the management information from the bit stream obtained by the control section 201 and selects a block to be decoded on the basis of the extracted management information (or the management information obtained by the control section 201) and the specification information obtained by the control section 201. That is, the block selecting section 211 selects the block satisfying a condition specified by the user on the basis of the management information of the block as a partial region in a predetermined three-dimensional spatial region including 3D data representing a three-dimensional structure.

For example, when a range of the three-dimensional spatial region in which to decode the coded data of a point cloud is specified by the specification information, the block selecting section 211 refers to the management information, and selects a block including the specified range on the basis of the "block position" and the "block size" in the block information. Because the "block position" and the "block size" are thus transmitted as management information, the block selecting section 211 can make a selection of a block including the specified range.

For example, in addition, when a necessary resolution is specified by the specification information, the block selecting section 211 refers to the management information, and selects a block including 3D data with a resolution equal to or higher than the specified necessary resolution on the basis of the "resolution" in the point information. Because the "resolution" is thus transmitted as management information, the block selecting section 211 can make a selection of a block according to the necessary resolution. Resolution scalability can be realized, for example, by setting plural blocks different from each other in the resolution of the 3D data in a same region and enabling a selection of a block according to such a necessary resolution.

Further, for example, when a solid structure is specified by the specification information, the block selecting section 211 refers to the management information, and selects a block including the 3D data of the specified solid structure on the basis of the "structure" in the point information. Because the "structure" is thus transmitted as management information, the block selecting section 211 can make a selection of a block including the data of the specified solid structure.

In addition, for example, when a necessary degree of reliability is specified by the specification information, the block selecting section 211 refers to the management information, and selects a block including 3D data with a degree of reliability equal to or higher than the specified necessary degree of reliability on the basis of the "degree of reliability" in the point information. Because the "degree of reliability" is thus transmitted as management information, the block selecting section 211 can make a selection of a block according to the necessary degree of reliability. Reliability degree scalability can be realized, for example, by setting plural blocks different from each other in the degree of reliability of the 3D data in a same region and enabling a selection of a block according to such a necessary degree of reliability.

Further, for example, when the presence or absence of color information in the attribute information of 3D data is specified by the specification information, the block selecting section 211 refers to the management information, and selects a block having (or not having) color information in the attribute information of the 3D data on the basis of the "color" in the attribute information. Because the "color" is thus transmitted as management information, the block selecting section 211 can make a selection of a block according to the presence or absence of the color information or the like.

In addition, for example, when the presence or absence of normal information in the attribute information of 3D data is specified by the specification information, the block selecting section 211 refers to the management information, and selects a block having (or not having) normal information in the attribute information of the 3D data on the basis of the "normal" in the attribute information. Because the "normal" is thus transmitted as management information, the block selecting section 211 can make a selection of a block according to the presence or absence of the normal information or the like.

Further, for example, when the presence or absence of reflectance information in the attribute information of 3D data is specified by the specification information, the block selecting section 211 refers to the management information, and selects a block having (or not having) reflectance information in the attribute information of the 3D data on the basis of the "reflectance" in the attribute information. Because the "reflectance" is thus transmitted as management information, the block selecting section 211 can make a selection of a block according to the presence or absence of the reflectance information or the like.

In addition, for example, when a condition related to a period (a time, a version, or the like) is specified by the specification information, the block selecting section 211 refers to the management information, and selects a block satisfying the condition related to the obtainment period of 3D data which condition is specified by the specification information on the basis of the "time" in the obtainment information. Because the "time" is thus transmitted as management information, the block selecting section 211 can, for example, make a selection of a block including latest data, a selection of a block including data obtained in a specified period, or the like.

Further, for example, when a condition related to a 3D data obtaining and calculating method is specified by the specification information, the block selecting section 211 refers to the management information, and selects a block satisfying the condition related to the 3D data obtaining and calculating method which condition is specified by the specification information on the basis of the "calculating method" in the obtainment information. Because the "calculating method" is thus transmitted as management information, the block selecting section 211 can, for example, make a selection of a block including 3D data obtained by a specified obtaining and calculating method or the like.

Further, for example, when a condition related to a sensor used in obtaining 3D data is specified by the specification information, the block selecting section 211 refers to the management information, and selects a block satisfying the condition related to a sensor used in obtaining 3D data which condition is specified by the specification information on the basis of the "sensor" in the obtainment information. Because the "sensor" is thus transmitted as management information, the block selecting section 211 can, for example, make a selection of a block including 3D data obtained by a specified sensor or the like.

In addition, for example, when a condition related to a 3D data obtainment position is specified by the specification information, the block selecting section 211 refers to the management information, and selects a block satisfying the condition related to an obtainment position which condition is specified by the specification information on the basis of the "obtainment position" in the obtainment information. Because the "obtainment position" is thus transmitted as management information, the block selecting section 211 can, for example, make a selection of a block including 3D data obtained at a specified position or the like.

Further, for example, when a condition related to an obtainer of 3D data is specified by the specification information, the block selecting section 211 refers to the management information, and selects a block satisfying the condition related to an obtainer which condition is specified by the specification information on the basis of the "obtainer" in the obtainment information. Because the "obtainer" is thus transmitted as management information, the block selecting section 211 can, for example, make a selection of a block including 3D data obtained by a specified user or the like.

As described above, the block selecting section 211 can select blocks satisfying conditions specified by the specification information with regard to various kinds of parameters included in the management information.

When the block selecting section 211 selects a block, the block selecting section 211 identifies the identification information of the selected block on the basis of the "block identification information" in the block information of the management information, and supplies the identified identification information (that is, the identification information of the selected block) as block selection information to the bit stream buffer 202. In addition, as required, the block selecting section 211 may also refer to the "data position" in the block information of the management information, and supply information indicating the data position of the selected block to the bit stream buffer 202.

Thus, the block selecting section 211 can control the bit stream buffer 202 and make the data of the selected block extracted.

The decoding control section 212 performs processing related to decoding control. For example, the decoding control section 212 extracts the management information from the bit stream obtained by the control section 201, and controls decoding on the basis of the extracted management information (or the management information obtained by the control section 201) and the specification information obtained by the control section 201. That is, the decoding control section 212 controls the decoding by setting a decoding method on the basis of the management information and the specification information and supplying decoding control information to the decoding section 203. For example, the decoding control section 212 controls a parameter used in the decoding and selects a decoding method.

The editing control section 213 performs processing related to editing of the data of a decoded block. For example, the editing control section 213 extracts the management information from the bit stream obtained by the control section 201 and controls the editing of the data of the decoded block on the basis of the extracted management information (or the management information obtained by the control section 201) and the specification information obtained by the control section 201. That is, the editing control section 213 controls the editing by setting editing contents on the basis of the management information and the specification information and supplying editing control information to the editing section 204.

(19)

The bit stream buffer 202 performs processing related to a bit stream. For example, the bit stream buffer 202 obtains the bit stream input to the decoding device 200 and retains the bit stream. In addition, the bit stream buffer 202 supplies the retained bit stream to the control section 201. Incidentally, the bit stream buffer 202 may extract the management information from the retained bit stream and supply the extracted management information to the control section 201. In addition, the bit stream buffer 202 obtains block selection information supplied from the block selecting section 211. Further, the bit stream buffer 202 extracts a bit stream (block bit stream) of the block selected by the block selecting section 211 (block specified by the block selection information) from the retained bit stream on the basis of the block selection information and supplies the bit stream to the decoding section 203.

(16)

The decoding section 203 performs processing related to decoding. For example, the decoding section 203 obtains the block bit stream supplied from the bit stream buffer 202. The decoding section 203 decodes the block bit stream, and thereby generates point cloud data (block point cloud data) of the block selected by the block selecting section 211. Incidentally, in a case where decoding control information is supplied from the decoding control section 212, the decoding section 203 obtains the decoding control information, and performs decoding according to the information. The decoding section 203 supplies the generated block point cloud data to the editing section 204.

(18)

The editing section 204 performs processing related to editing of the block point cloud data as a result of the decoding by the decoding section 203. For example, the editing section 204 obtains the block point cloud data supplied from the decoding section 203. In addition, the editing section 204 obtains editing control information supplied from the editing control section 213. Further, the editing section 204 edits the block point cloud data on the basis of the editing control information.

As this editing, the editing section 204, for example, deletes information from the block point cloud data, adds information to the block point cloud data, or updates information in the block point cloud data. For example, the editing section 204 synthesizes the block point cloud data of a plurality of blocks or cuts out and deletes a part of the block point cloud data.

The editing section 204 outputs point cloud data edited as appropriate to the outside of the decoding device 200.

<Decoding Example>

Figure 11:
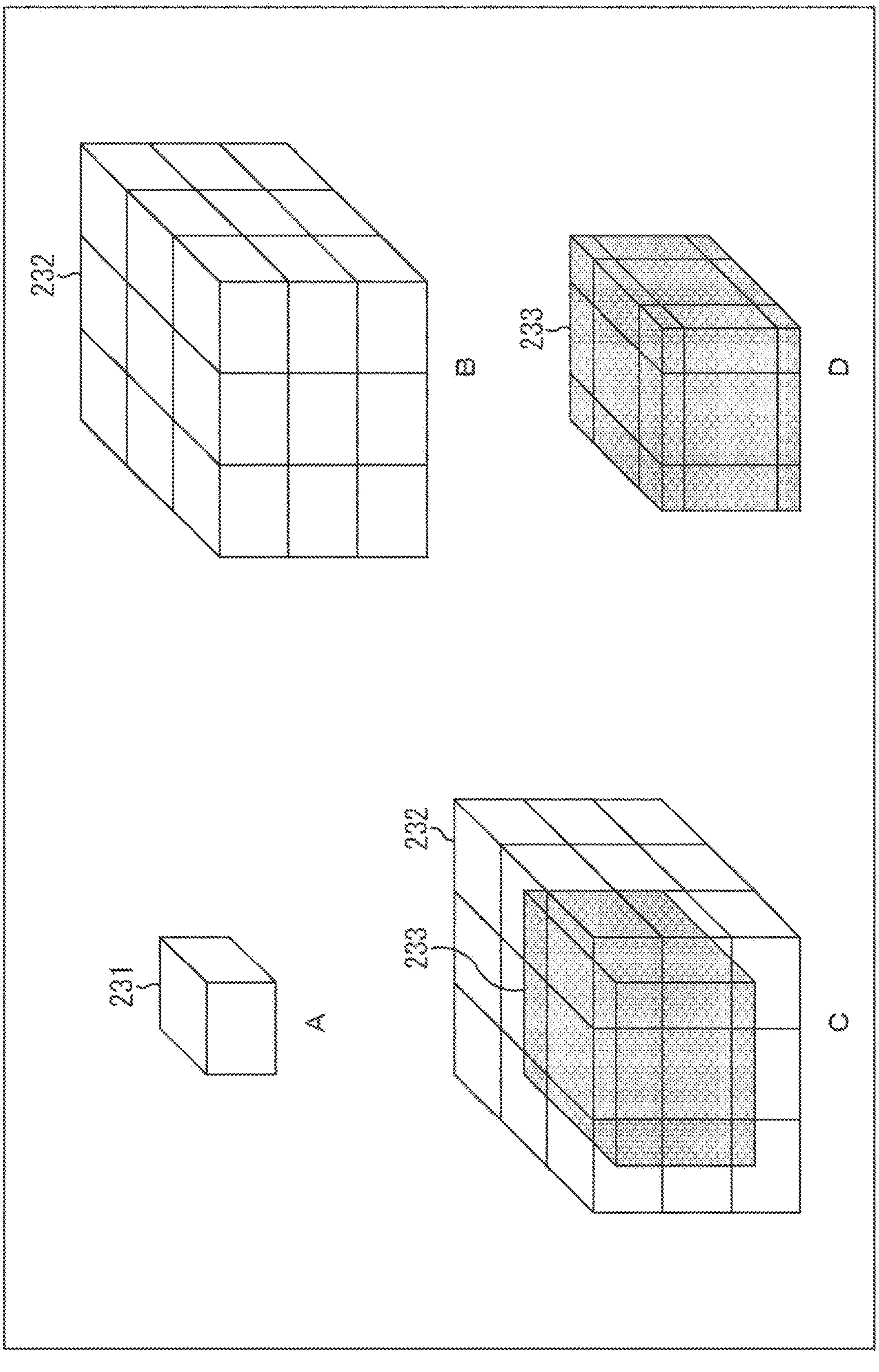
FIG. 11 is a diagram of assistance in explaining an example of a manner of decoding.

Suppose, for example, that a rectangular block 231 as illustrated in A OF FIG. 11 is set, and that a three-dimensional spatial region obtained by arranging 3×3×3 blocks 231 next to each other as in B OF FIG. 11 is set.

Suppose that a partial region 233 in the three-dimensional spatial region 232 as illustrated in C OF FIG. 11 is to be decoded. The region 233 straddles all of the blocks 231 in the three-dimensional spatial region 232, as illustrated in D OF FIG. 11. Hence, in this case, the block selecting section 211 selects all of the blocks 231 in the three-dimensional spatial region 232, and the decoding section decodes all of the blocks 231 in the three-dimensional spatial region 232. However, necessary information is 3D data within the region 233 illustrated in D OF FIG. 11. Hence, in this case, the editing section 204 extracts the 3D data within the region 233 from the 3D data of the whole of the three-dimensional spatial region 232 obtained by the decoding of the decoding section 203.

Incidentally, in a case where the decoding section 203 supports partial region decoding and is capable of decoding only a partial region of the block bit stream, the decoding section 203 may be made to decode only the 3D data within the region 233 by the control of the decoding control section 212.

<Decoding Section>

Figure 12:
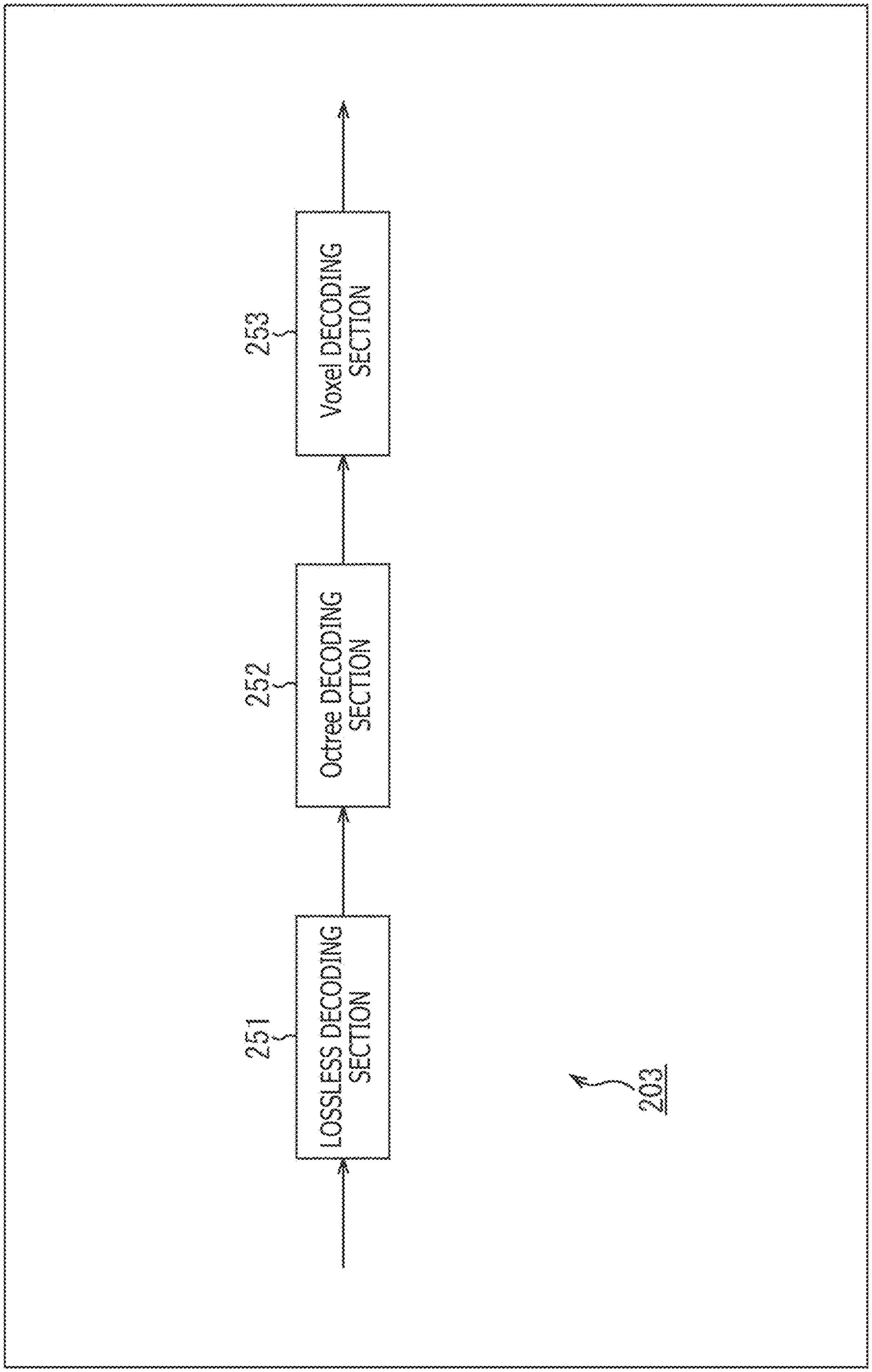
FIG. 12 is a block diagram illustrating an example of a main configuration of a decoding section.

FIG. 12 is a block diagram illustrating an example of a main configuration of the decoding section 203 in FIG. 10. As illustrated in FIG. 12, the decoding section 203 includes a lossless decoding section 251, an Octree decoding section 252, and a Voxel decoding section 253.

The lossless decoding section 251 performs processing related to lossless decoding of coded data. For example, the lossless decoding section 251 obtains the block bit stream supplied from the bit stream buffer 202. In addition, the lossless decoding section 251 decodes the block bit stream, and thereby generates Octree data of a selected block (which data will be referred to also as block Octree data). Incidentally, in a case where decoding control information is supplied from the decoding control section 212, the lossless decoding section 251 performs decoding according to the decoding control information. Further, the lossless decoding section 251 supplies the block Octree data to the Octree decoding section 252.

The Octree decoding section 252 performs processing related to decoding of an Octree. For example, the Octree decoding section 252 obtains the block Octree data supplied from the lossless decoding section 251. In addition, the Octree decoding section 252 constructs the Octree of the selected block (which Octree will be referred to also as a block Octree) from the block Octree data and generates voxel data of the selected block (which data will be referred to also as block voxel data) from the block Octree. The Octree decoding section 252 supplies the generated block voxel data to the Voxel decoding section 253.

The Voxel decoding section 253 performs processing related to decoding of voxel data. For example, the Voxel decoding section 253 obtains the block voxel data supplied from the Octree decoding section 252. In addition, the Voxel decoding section 253 reconstructs a point cloud (block point cloud data) of the selected block from the obtained block voxel data. The Voxel decoding section 253 supplies the thus generated block point cloud data to the editing section 204 (FIG. 10).

Incidentally, these processing sections (the lossless decoding section 251, the Octree decoding section 252, and the Voxel decoding section 253) have an optional configuration. For example, each processing section may include a logic circuit that implements the above-described processing. In addition, each processing section may have, for example, a CPU, a ROM, a RAM, and the like, and may implement the above-described processing by executing a program using the CPU, the ROM, the RAM, and the like. Needless to say, each processing section may have the configurations of both thereof and implement a part of the above-described processing by a logic circuit and implement the rest by executing a program. The configurations of the respective processing sections may be independent of each other. For example, a part of the processing sections may implement a part of the above-described processing by a logic circuit, another part of the processing sections may implement the above-described processing by executing a program, and yet another processing section may implement the above-described processing by both of a logic circuit and the execution of a program.

By having a configuration as described above, the decoding device 200 can more easily perform partial decoding of the 3D data on the basis of the management information.

<Flow of Decoding Processing>

An example of a flow of decoding processing performed by the decoding device 200 will next be described with reference to a flowchart of FIG. 13.

When the decoding processing is started, the bit stream buffer 202 of the decoding device 200 obtains a bit stream in step S201.

In step S202, the control section 201 receives specification information.

(20)

In step S203, the block selecting section 211 selects a block to be decoded on the basis of the management information extracted from the bit stream obtained by the processing of step S201 and the specification information received in step S202.

In step S204, the bit stream buffer 202 extracts a bit stream of the block selected in step S203 from the bit stream obtained in step S201.

In step S205, the decoding control section 212 sets a decoding method on the basis of the management information extracted from the bit stream obtained by the processing of step S201 and the specification information received in step S202.

(20)

In step S206, the decoding section 203 performs block decoding processing. The decoding section 203 decodes the bit stream of the block extracted in step S204 by the decoding method set in step S205, and thereby generates point cloud data of the block.

In step S207, the editing control section 213 sets an editing method on the basis of the management information extracted from the bit stream obtained by the processing of step S201 and the specification information received in step S202.

In step S208, the editing section 204 edits the point cloud data generated in step S206 by the editing method set in step S207.

In step S209, the editing section 204 outputs the point cloud data edited in step S208 to the outside of the decoding device 200.

When the processing of step S209 is ended, the decoding processing is ended.

<Flow of Block Decoding Processing>

An example of a flow of the block decoding processing performed in step S206 in FIG. 13 will be described with reference to a flowchart of FIG. 14.

When the block decoding processing is started, the lossless decoding section 251 selects a processing target block from among unprocessed blocks in step S221.

In step S222, the lossless decoding section 251 decodes a bit stream of the processing target block and generates Octree data of the processing target block.

In step S223, the Octree decoding section 252 constructs an Octree of the processing target block from the Octree data of the processing target block, the Octree data being generated in step S222, and generates voxel data of the processing target block.

In step S224, the Voxel decoding section 253 generates point cloud data of the processing target block from the voxel data of the processing target block, the voxel data being generated in step S223.

In step S225, the decoding section 203 determines whether or not all of selected blocks are processed. In a case where it is determined that there is an unprocessed block, the processing returns to step S221 to repeat the processing from step S221 on down.

Figure 13:
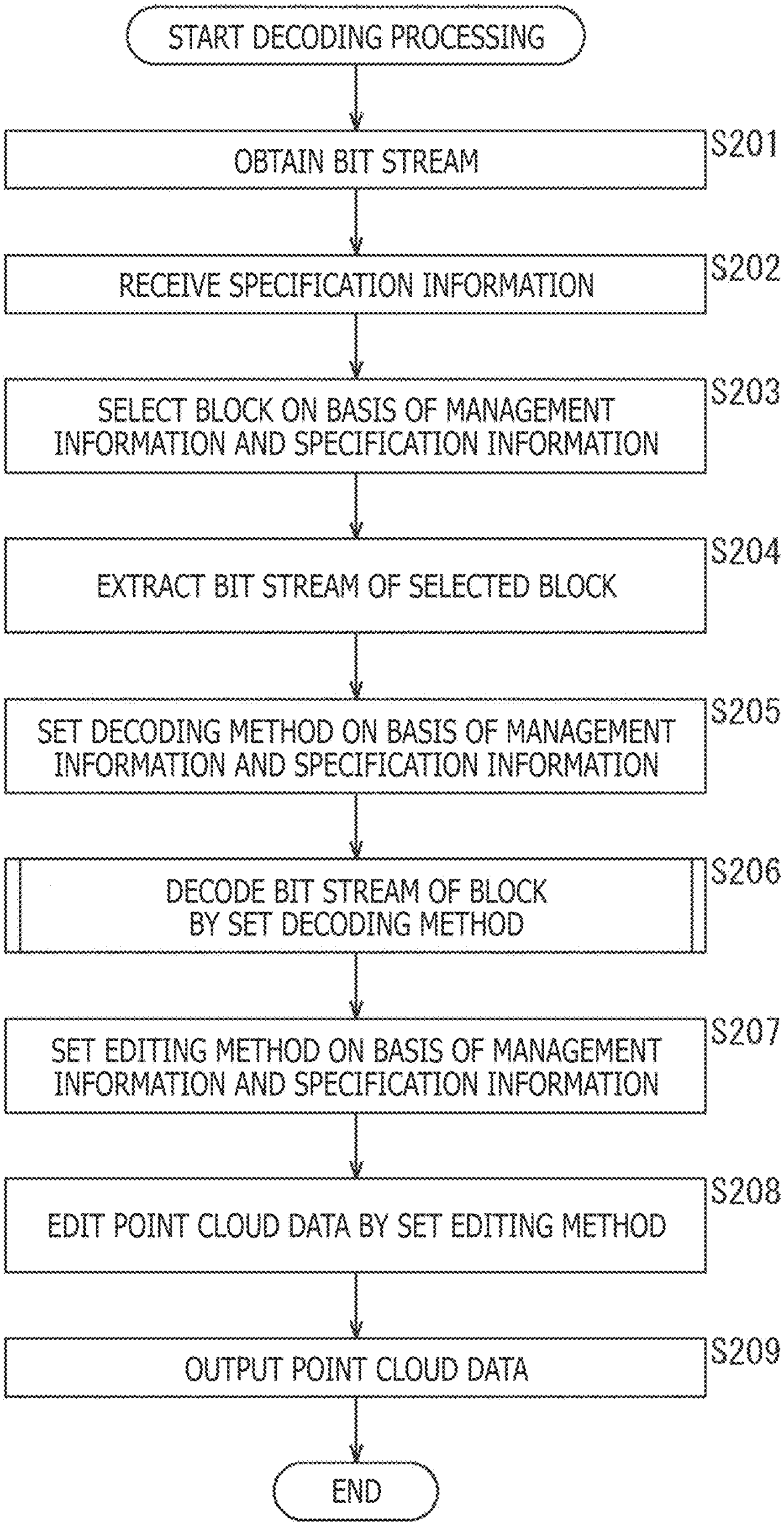
FIG. 13 is a flowchart of assistance in explaining an example of a flow of decoding processing.
Figure 14:
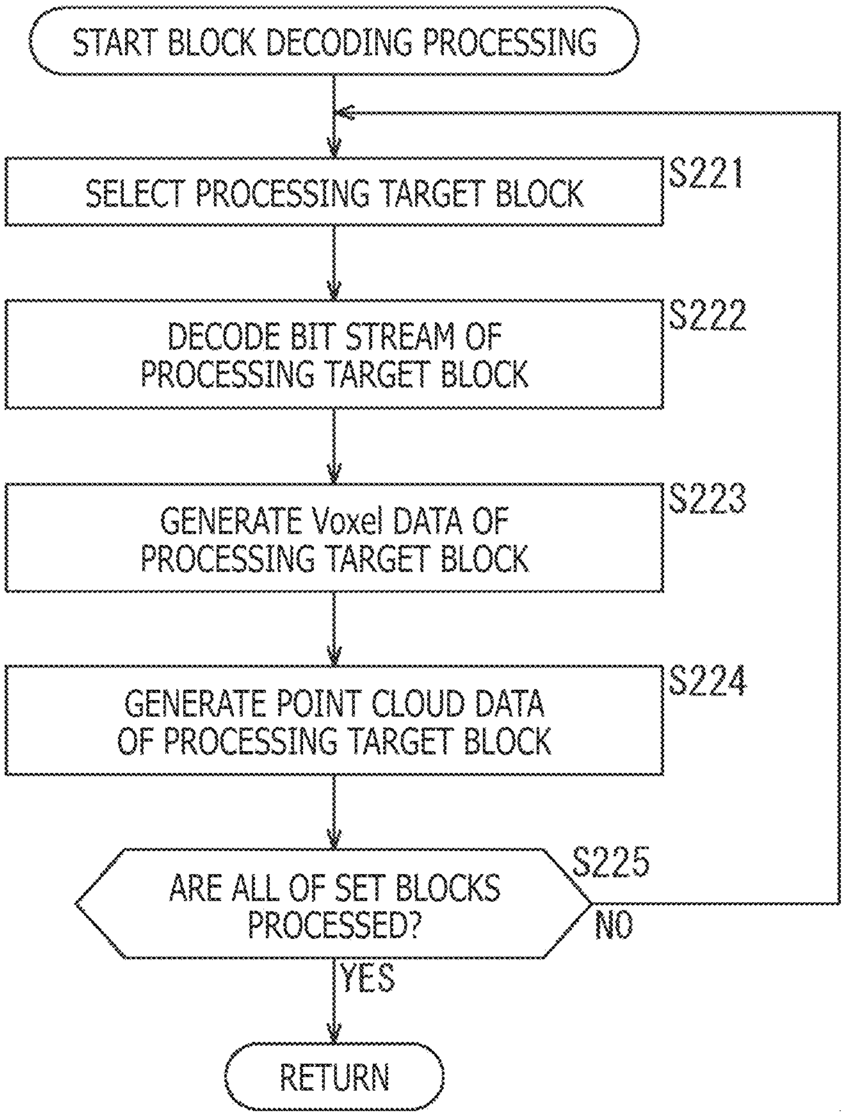
FIG. 14 is a flowchart of assistance in explaining an example of a flow of block decoding processing.

In addition, in a case where it is determined in step S225 that all of the blocks are processed, the block decoding processing is ended, and the processing returns to FIG. 13.

By performing each piece of processing as described above, the decoding device 200 can more easily perform partial decoding of the 3D data on the basis of the management information.

3. USE CASES

Description will next be made of use cases of the coding device 100 and the decoding device 200 described above. Suppose, for example, that blocks $B_0$ to $B_4$ as illustrated in FIG. 15A are set. Suppose that the position of a block at World coordinates is $B_n$(add) (=(x, y, z)), and that the size of the block is $B_n$(size) (=size). In this case, the positions and sizes of the blocks $B_0$ to $B_4$ are set as in respective equations in FIG. 15B. Similar equations are also illustrated in the following.

$$B_0(\text{add})=(0,0,0), B_0(\text{size})=10$$

$$B_1(\text{add})=(10,0,0), B_1(\text{size})=10$$

$B_2(\text{add})=(0,10,0), B_2(\text{size})=10$ $B_3(\text{add})=(10,10,0), B_3(\text{size})=10$ $B_4(\text{add})=(5,5,5), B_4(\text{size})=10$ Suppose that each such block is coded.

Case 1

Suppose, for example, that decoding of 3D data of a region as illustrated in FIG. 15C is specified by the specification information. This range is also illustrated in the following.

$B_d(\text{loc})=(5,5,0\text{-}15,15,5)$

First, the block selecting section 211 identifies blocks including this region from $B_d$(loc). In this case, the blocks $B_0$ to $B_3$ correspond. Then, because the regions of the blocks do not overlap each other, the block selecting section 211 selects all of the blocks $B_0$ to $B_3$. The decoding section 203 decodes the coded data of the blocks $B_0$ to $B_3$ selected by the block selecting section, and thereby generates 3D data (for example, point cloud data).

Case 2

Suppose, for example, that decoding of 3D data of a region as illustrated in FIG. 15D is specified by the specification information. This range is also illustrated in the following.

$B_d(\text{loc})=(5,5,5\text{-}15,15,10)$

First, the block selecting section 211 identifies blocks including this region from $B_d$(loc). In this case, the blocks $B_0$ to $B_4$ correspond. Then, the block $B_4$ overlaps the other blocks. The ratio of the block $B_4$ to $B_d$(loc) is 100%, and the ratio of the blocks $B_0$ to $B_4$ to $B_d$(loc) is 25%. Hence, the block selecting section 211 selects the block $B_4$. The decoding section 203 decodes the coded data of the block $B_4$ selected by the block selecting section, and thereby generates 3D data (for example, point cloud data).

Case 3

Figure 15:
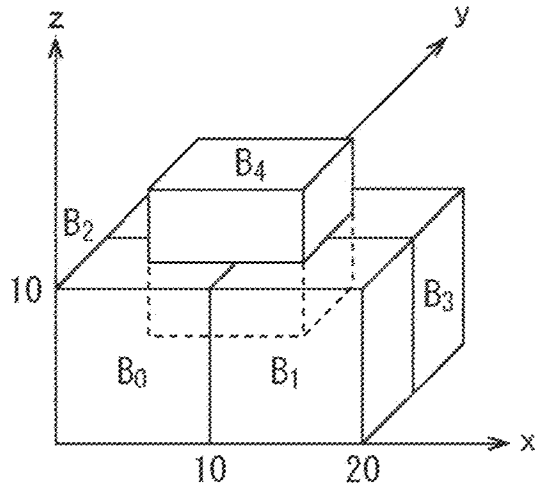
FIG. 15 is a diagram of assistance in explaining use cases.

Suppose, for example, that decoding of 3D data of a region as illustrated in E of FIG. 15 is specified by the specification information. This range is also illustrated in the following.

$B_d(\text{loc})=(5,5,5\text{-}10,10,10)$

First, the block selecting section 211 identifies blocks including this region from $B_d$(loc). In this case, the block $B_0$ and the block $B_4$ correspond. Then, the block $B_0$ and the block $B_4$ overlap each other. The ratio of both of the block $B_0$ and the block $B_4$ to $B_d$(loc) is 100%. Hence, the block selecting section 211 may determine an order of priority on the basis of another element (additional information) in these corresponding blocks and make a selection so as to avoid duplication. For example, a newer block may be selected from an update time or the like. The decoding section 203 decodes the coded data of the block selected by the block selecting section, and thereby generates 3D data (for example, point cloud data).

As described above, the decoding device 200 can easily decode a block in an optional position, an optional size, and an optional shape on the basis of the management information. That is, the decoding device 200 can more easily perform partial decoding of the 3D data on the basis of the management information.

4. THIRD EMBODIMENT

<Another Configuration Example 1 of Coding Device>

Figure 16:
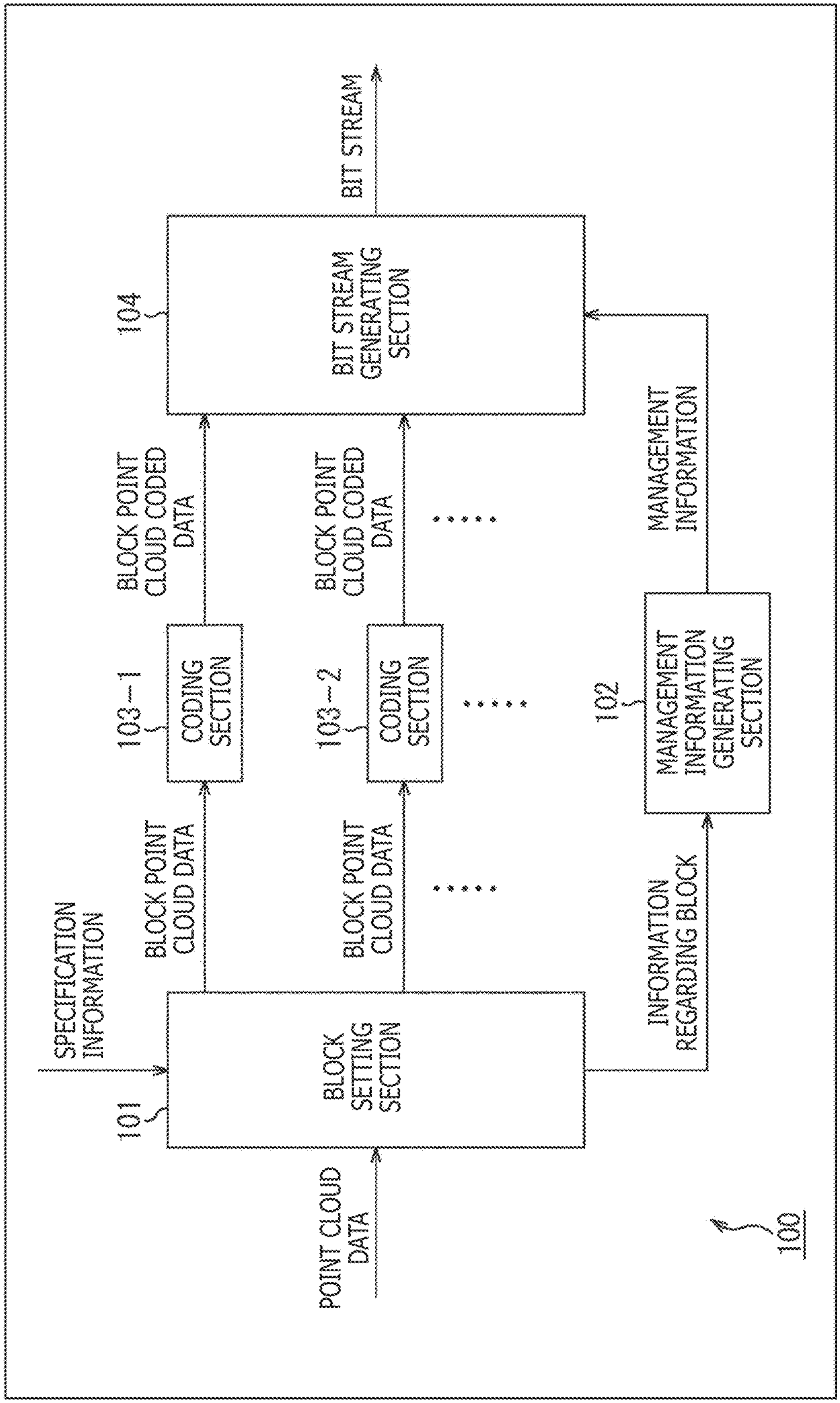
FIG. 16 is a block diagram illustrating an example of a main configuration of a coding device.

Incidentally, the configuration of the coding device 100 is optional and is not limited to the configuration example (FIG. 1) described in <1. First Embodiment>. For example, as illustrated in FIG. 16, the coding device 100 may have plural coding sections 103-N capable of performing processing in parallel with each other in place of the coding section 103. In this case, when plural blocks is set in the block setting section 101, the point cloud data (block point cloud data) of the respective blocks is supplied to the coding sections 103-N different from each other and is coded independently of each other. Then, the bit stream generating section 104 obtains the block point cloud coded data supplied from the respective coding sections 103-N and generates a bit stream including the block point cloud coded data of those coding sections 103-N and the management information.

Thus, parallel processing of coding is possible. Incidentally, the coding section 103 in FIG. 1 may be enabled to decode plural pieces of block point cloud data in parallel with each other.

<Another Configuration Example 2 of Coding Device>

Figure 17:
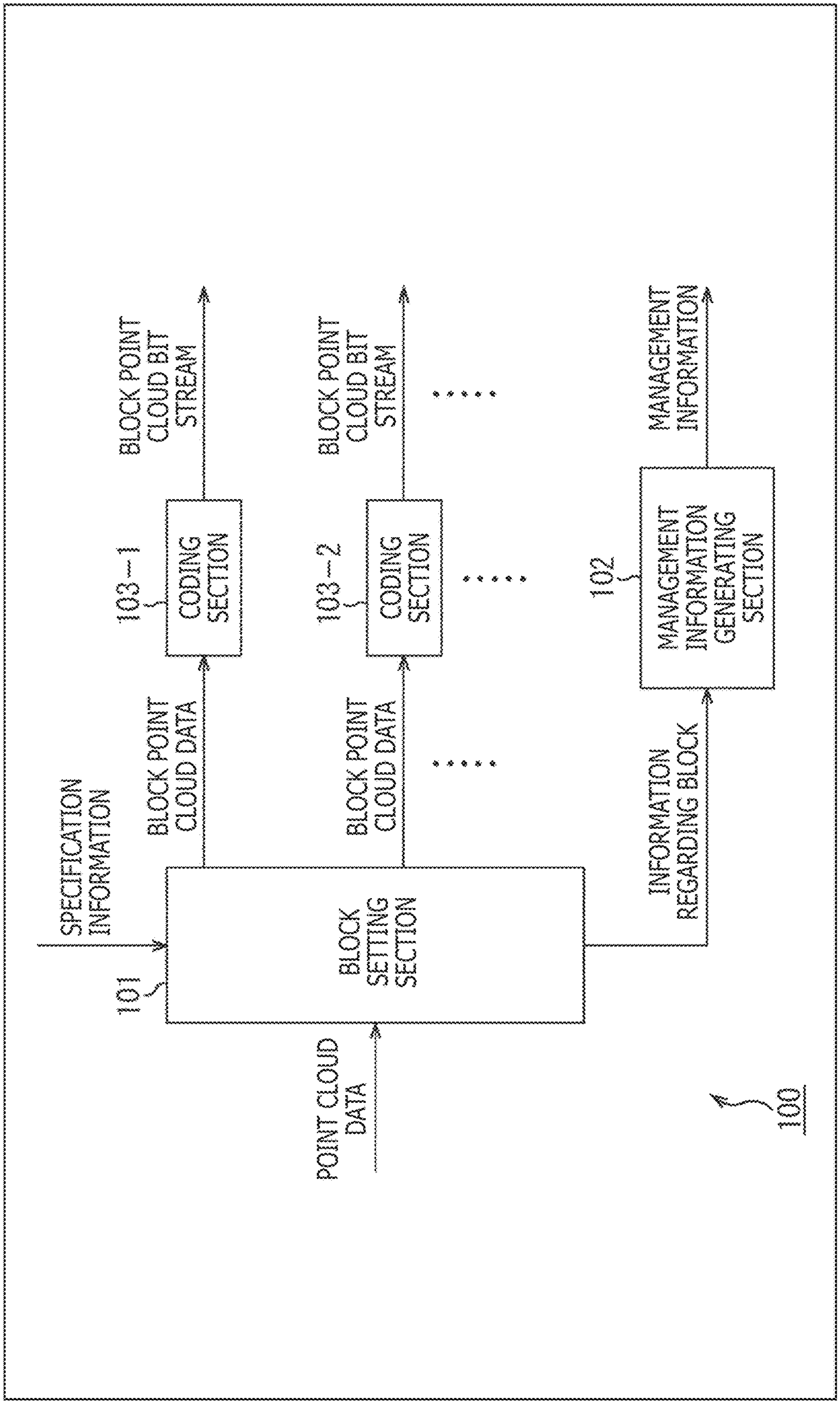
FIG. 17 is a block diagram illustrating an example of a main configuration of a coding device.

In addition, as illustrated in FIG. 17, the bit stream generating section may be further omitted from the configuration example of FIG. 16. In this case, block point cloud bit streams generated in the respective coding sections 103-N and the management information generated in the management information generating section 102 are each output as individual information.

5. FOURTH EMBODIMENT

<Another Configuration Example 1 of Decoding Device>

Figure 18:
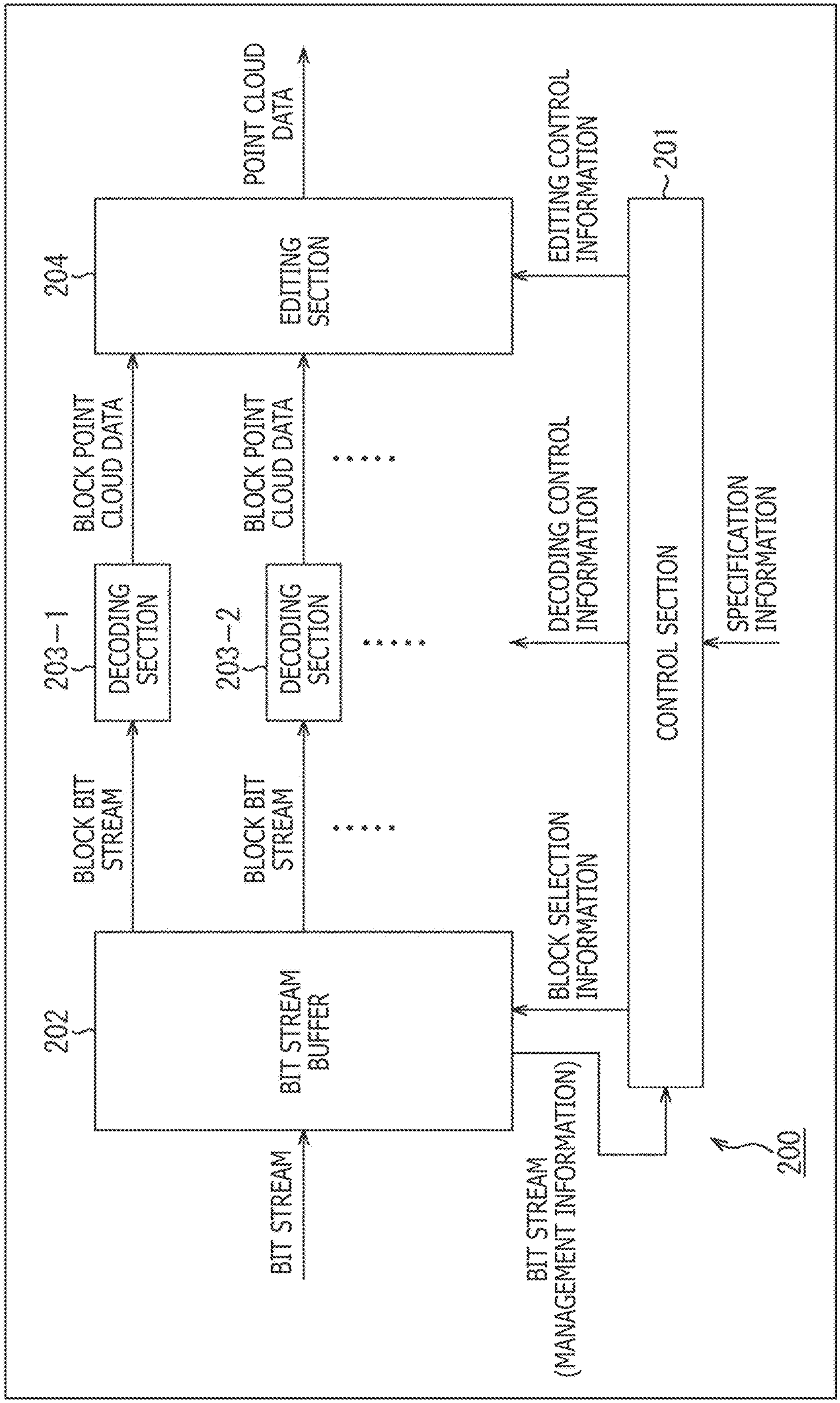
FIG. 18 is a block diagram illustrating an example of a main configuration of a decoding device.
Figure 19:
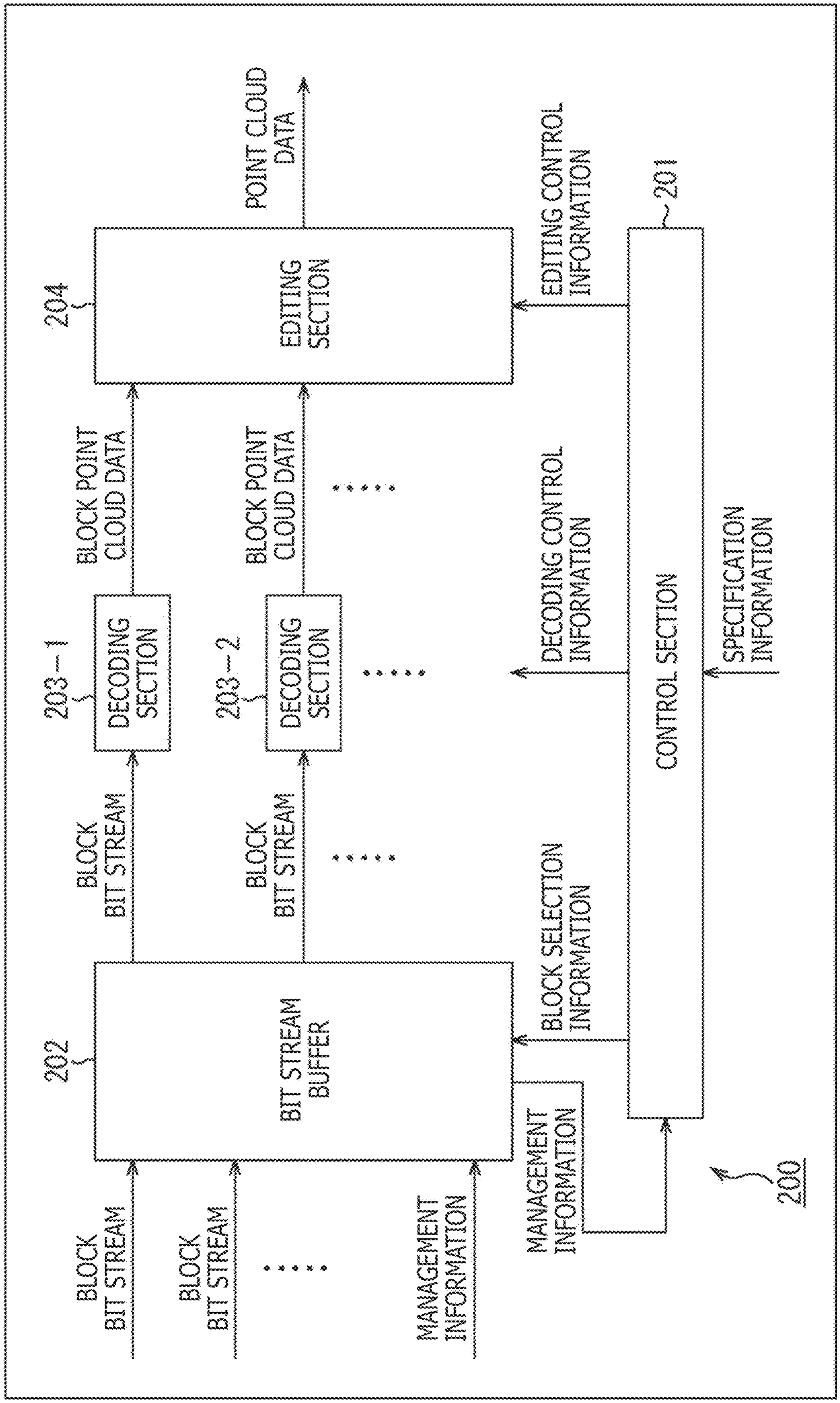
FIG. 19 is a block diagram illustrating an example of a main configuration of a decoding device.

As in the case of the coding device 100, the configuration of the decoding device 200 is also optional and is not limited to the configuration example (FIG. 10) described in <2. Second Embodiment>. For example, as illustrated in FIG. 18, the decoding device 200 may have plural decoding sections 203-N capable of performing processing in parallel with each other in place of the decoding section 203. In this case, when plural blocks is set as decoding targets in the control section 201, the bit streams (block bit streams) of the respective blocks are supplied to the decoding sections 203-N different from each other and are decoded independently of each other. Then, the editing section 204 obtains block point cloud data supplied from each of the decoding sections 203-N and generates point cloud data by editing these pieces of block point cloud data.

Thus, parallel processing of decoding is possible. Incidentally, the decoding section 203 in FIG. 10 may be enabled to decode plural block bit streams in parallel with each other.

<Another Configuration Example 2 of Decoding Device>

In addition, as illustrated in FIG. 18, a plurality of block bit streams and management information may be input to the decoding device 200. In this case, the bit stream buffer 202 obtains and retains the plurality of block bit streams and the management information input to the decoding device 200. Then, the bit stream buffer 202 supplies the obtained management information to the control section 201, while the bit stream buffer 202 reads the block bit stream of a block selected by the control section 201 according to block selection information, and supplies the block bit stream to the decoding sections 203-N.

6. SUPPLEMENTARY NOTES

<Computer>

The above-described series of processing can be performed by hardware or can be performed by software. In a case where the series of processing is performed by software, a program constituting the software is installed on a computer. Here, the computer includes a computer incorporated in dedicated hardware, a general-purpose personal computer, for example, capable of performing various kinds of functions by installing various kinds of programs thereon, and the like.

Figure 20:
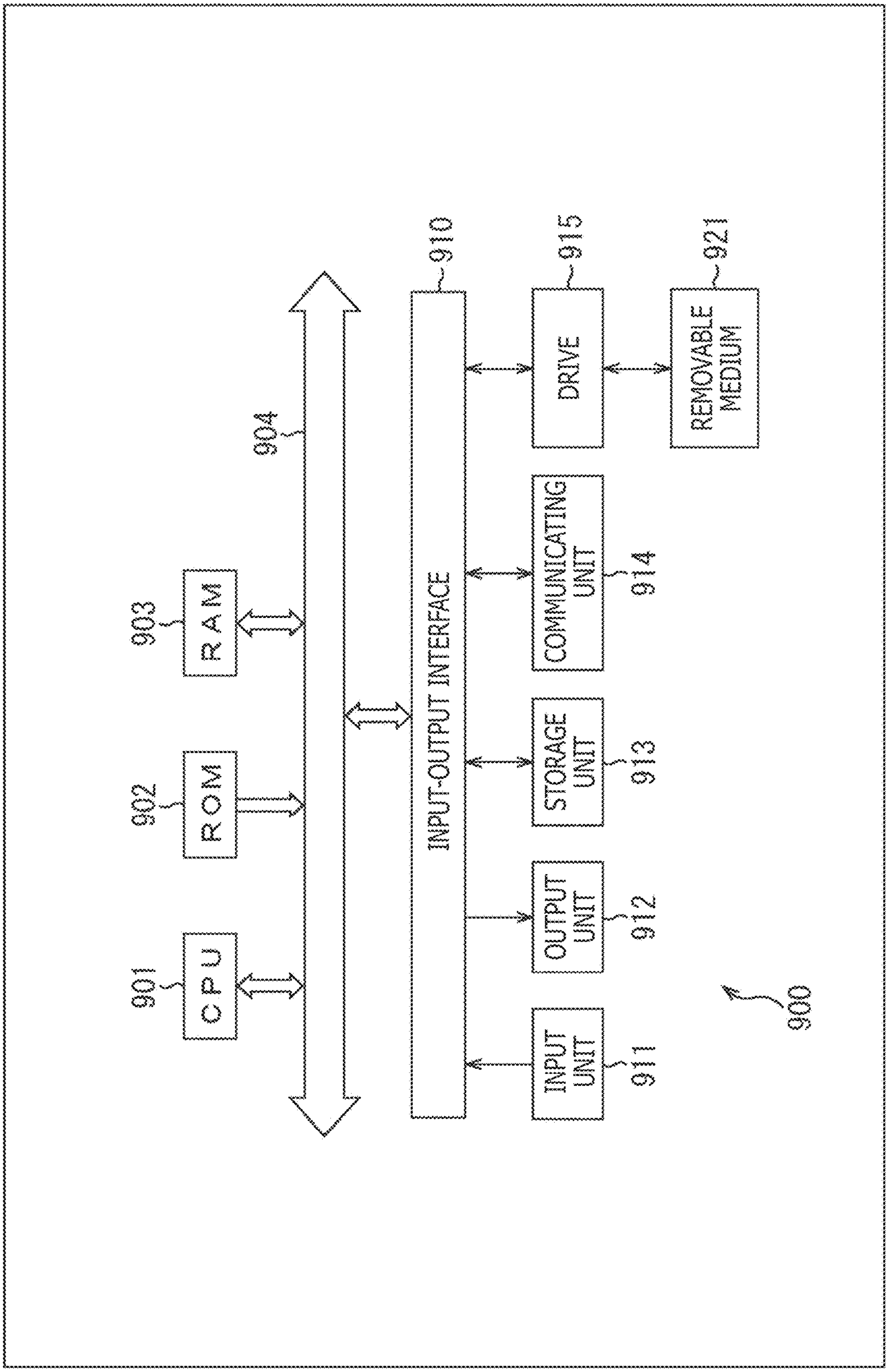
FIG. 20 is a block diagram illustrating an example of a main configuration of a computer.

FIG. 20 is a block diagram illustrating an example of a configuration of hardware of a computer that performs the above-described series of processing by a program.

In a computer 900 illustrated in FIG. 20, a CPU (Central Processing Unit) 901, a ROM (Read Only Memory) 902, and a RAM (Random Access Memory) 903 are interconnected via a bus 904.

An input-output interface 910 is also connected to the bus 904. The input-output interface 910 is connected with an input unit 911, an output unit 912, a storage unit 913, a communicating unit 914, and a drive 915.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communicating unit 914 includes, for example, a network interface. The drive 915 drives a removable medium 921 such as a magnetic disk, an optical disk, a magneto-optical disk, or a semiconductor memory.

In the computer configured as described above, the above-described series of processing is performed by the CPU 901 by, for example, loading a program stored in the storage unit 913 into the RAM 903 via the input-output interface 910 and the bus 904 and executing the program. The RAM 903 also stores data necessary for the CPU 901 to perform various kinds of processing and the like as appropriate.

The program executed by the computer (CPU 901) can, for example, be applied in a state of being recorded on the removable medium 921 as a package medium or the like. In that case, the program can be installed in the storage unit 913 via the input-output interface 910 by loading the removable medium 921 into the drive 915.

In addition, this program can also be provided via a wired or radio transmission medium such as a local area network, the Internet, or digital satellite broadcasting. In that case, the program can be received by the communicating unit 914 and installed in the storage unit 913.

Besides, the program can also be installed in the ROM 902 or the storage unit 913 in advance.

<Targets for Application of Present Technology>

In the above, description has been made of a case where the present technology is applied to coding and decoding of point cloud data. However, the present technology is not limited to these examples, but can be applied to coding and decoding of 3D data of optional standards. That is, specifications of various kinds of processing such as coding and decoding methods and various kinds of data such as 3D data and metadata are optional unless inconsistent with the above-described present technology. In addition, a part of the processing and the specifications described above may be omitted unless inconsistency with the present technology occurs.

The present technology can be applied to optional configurations. For example, the present technology can be applied to various electronic apparatuses such as a transmitter and a receiver (for example, a television receiver or a mobile telephone) in satellite broadcasting, wire broadcasting such as cable TV, distribution on the Internet, and distribution to a terminal by cellular communication, or a device (for example, a hard disk recorder or a camera) for recording an image on a medium such as an optical disk, a magnetic disk, and a flash memory and reproducing the image from these storage media.

In addition, for example, the present technology can also be implemented as a part of a configuration of a device such as a processor (for example, a video processor) as a system LSI (Large Scale Integration) or the like, a module (for example, a video module) using a plurality of processors or the like, a unit (for example, a video unit) using a plurality of modules or the like, a set (for example, a video set) obtained by further adding other functions to the unit, or the like.

In addition, for example, the present technology can also be applied to a network system including a plurality of devices. For example, the present technology may be implemented as cloud computing in which a plurality of devices shares and jointly performs processing via a network. For example, the present technology may be implemented in cloud service providing service related to images (moving images) to an optional terminal such as a computer, an AV (Audio Visual) apparatus, a portable information processing terminal, or an IoT (Internet of Things) device.

Incidentally, in the present specification, a system refers to a set of a plurality of constituent elements (devices, modules (parts), or the like), and it does not matter whether or not all of the constituent elements are present in a same casing. Hence, a plurality of devices housed in separate casings and connected to each other via a network and one device having a plurality of modules housed in one casing are both a system.

<Fields and Uses to which Present Technology is Applicable>

A system, a device, a processing unit, and the like to which the present technology is applied can, for example, be used in optional fields such as traffic, medical care, crime prevention, agriculture, the livestock industry, the mining industry, cosmetology, factories, household electric appliances, weather, and nature monitoring. In addition, uses thereof are optional.

<Others>

Incidentally, a "flag" in the present specification is information for distinguishing a plurality of states and includes not only information used to distinguish two states, that is, true (1) or false (0) but also information capable of distinguishing three or more states. Hence, values that can be assumed by this "flag" may, for example, be two values of I/O, or equal to or more than three values. That is, the number of bits constituting this "flag" is optional, and the "flag" may be constituted by one bit or a plurality of bits. In addition, identification information (including flags) is assumed to be not only in a form in which the identification information is included in a bit stream but also in a form in which differential information of the identification information with respect to reference information is included in a bit stream. Thus, in the present specification, a "flag" and "identification information" include not only the information but also differential information with respect to reference information.

In addition, various kinds of information (metadata and the like) related to coded data (bit stream) may be transmitted or recorded in any form as long as the various kinds of information (metadata and the like) are associated with the coded data. Here, the term "associate" means that, for example, another piece of data is made to be able to be used (able to be linked) when one piece of data is processed. That is, pieces of data associated with each other may be integrated as one piece of data or may be respective individual pieces of data. For example, the information associated with the coded data (image) may be transmitted on a different transmission line from that of the coded data (image). In addition, for example, the information associated with the coded data (image) may be recorded on a different recording medium (or on a different recording area of a same recording medium) from that of the coded data (image). Incidentally, this "association" may be association of a part of data rather than the whole data. For example, images and information corresponding to the images may be associated with each other in optional units such as a plurality of frames, one frame, or a part within a frame.

Incidentally, terms such as "synthesize," "multiplex," "add," "integrate," "include," "store," "put in," "inset," and "insert," in the present specification mean integrating plural objects into one, for example, integrating coded data and metadata into one piece of data, and mean one method of "associate" described above.

In addition, embodiments of the present technology are not limited to the foregoing embodiments but are susceptible of various modifications without departing from the spirit of the present technology.

For example, a configuration described as one device (or one processing section) may be divided and configured as a plurality of devices (or processing sections). Conversely, configurations described as a plurality of devices (or processing sections) in the above may be integrated and configured as one device (or one processing section). In addition, a configuration other than the foregoing may Needless to say be added to the configuration of each device (or each processing section). Further, a part of the configuration of a certain device (or a certain processing section) may be included in the configuration of another device (or another processing section) as long as the configuration and operation of a system as a whole are essentially the same.

In addition, for example, the above-described program may be executed in an optional device. In that case, it is only required that the device has necessary functions (functional blocks or the like) and be able to obtain necessary information.

In addition, for example, each step of one flowchart may be performed by one device or may be shared and performed by a plurality of devices. Further, in a case where one step includes a plurality of pieces of processing, the plurality of pieces of processing may be performed by one device or may be shared and performed by a plurality of devices. In other words, a plurality of pieces of processing included in one step can also be performed as processing of a plurality of steps. Conversely, processing described as a plurality of steps can also be performed collectively as one step.

In addition, for example, in the program executed by the computer, the processing of steps describing the program may be performed in time series in the order described in the present specification or may be performed in parallel or individually in necessary timing when a call is performed, for example. That is, unless inconsistency occurs, the processing of each step may be performed in an order different from the above-described order. Further, the processing of the steps describing the program may be performed in parallel with the processing of another program or may be performed in combination with the processing of another program.

In addition, for example, plural technologies related to the present technology can be performed singly independently of each other unless inconsistency arises. Needless to say, optional plural ones of the present technologies can also be implemented in combined use. For example, a part or the whole of a present technology described in one embodiment can be performed in combination with a part or the whole of a present technology described in another embodiment. In addition, a part or the whole of an optional present technology described above can be performed in combination with another technology not described above.

Incidentally, the present technology can also adopt the following configurations.

(1)

An image processing device including:

a management information generating section configured to generate management information of a block as a partial region in a predetermined three-dimensional spatial region including 3D data representing a three-dimensional structure.

(2)

The image processing device according to (1), in which the management information includes block information as information regarding the block.

(3)

The image processing device according to (2), in which the block information includes at least any one of identification information of the block, a position of the block, a size of the block, or a position of data of the block.

(4)

The image processing device according to any one of (1) to (3), in which the management information includes positional information as information regarding positional information of the 3D data within the block.

(5)

The image processing device according to (4), in which the positional information includes at least any one of a resolution of the 3D data, the three-dimensional structure represented by the 3D data, or a degree of reliability of the 3D data.

(6)

The image processing device according to any one of (1) to (5), in which the management information includes attribute information as information regarding attribute information of the 3D data within the block.

(7)

The image processing device according to (6), in which the attribute information includes at least any one of a color, a normal, or a reflectance of the 3D data.

(8)

The image processing device according to any one of (1) to (7), in which the management information includes obtainment information as information regarding obtainment of the 3D data.

(9)

The image processing device according to (8), in which the obtainment information includes at least any one of an obtainment time of the 3D data, a calculating method of the 3D data, a sensor used in obtaining the 3D data, an obtainment position of the 3D data, or an obtainer of the 3D data.

(10)

The image processing device according to any one of (1) to (9), in which the management information includes whole region information as information regarding a whole of the three-dimensional spatial region.

(11)

The image processing device according to (10), in which the whole region information includes at least any one of a position of the whole of the three-dimensional spatial region, a size of the whole of the three-dimensional spatial region, information regarding blocks included in the three-dimensional spatial region, or management information common to all of the blocks included in the three-dimensional spatial region.

(12)

The image processing device according to any one of (1) to (11), further including:

a bit stream generating section configured to generate a bit stream including coded data of the 3D data and the management information generated by the management information generating section.

(13)

The image processing device according to any one of (1) to (12), further including:

a block setting section configured to set the block managed by the management information generated by the management information generating section.

(14)

The image processing device according to (13), further including:

a coding section configured to code the 3D data within the block set by the block setting section.

(15)

An image processing method including:

generating management information of a block as a partial region in a predetermined three-dimensional spatial region including 3D data representing a three-dimensional structure.

(16)

An image processing device including:

a block selecting section configured to select a block satisfying a condition specified by a user on the basis of management information of the block as a partial region in a predetermined three-dimensional spatial region including 3D data representing a three-dimensional structure; and a decoding section configured to decode coded data of the 3D data within the block selected by the block selecting section.

(17)

The image processing device according to (16), further including:

a decoding control section configured to control decoding of the coded data by the decoding section on the basis of the management information and an instruction by the user.

(18)

The image processing device according to (16) or (17), further including:

an editing control section configured to control editing of the 3D data on the basis of the management information and an instruction by the user; and an editing section configured to edit the 3D data generated by the decoding section by decoding the coded data according to control of the editing control section.

(19)

The image processing device according to any one of (16) to (18), further including:

an extracting section configured to extract the coded data of the 3D data within the block selected by the block selecting section from the coded data of the 3D data of a whole of the three-dimensional spatial region, in which the decoding section decodes the coded data of the 3D data within the block selected by the block selecting section, the coded data being extracted by the extracting section.

(20)

An image processing method including:

selecting a block satisfying a condition specified by a user on the basis of management information of the block as a partial region in a predetermined three-dimensional spatial region including 3D data representing a three-dimensional structure; and decoding coded data of the 3D data within the selected block.

REFERENCE SIGNS LIST

100: Coding device
101: Block setting section
102: Management information generating section
103: Coding section
104: Bit stream generating section
181: Voxel generating section
182: Octree generating section
183: Lossless coding section
200: Decoding device
201: Control section
202: Bit stream buffer
203: Decoding section
204: Editing section
211: Block selecting section
212: Decoding control section
213: Editing control section
251: Lossless decoding section
252: Octree decoding section
253: Voxel decoding section

The invention claimed is:

1. An image decoding device comprising:

at least one processor configured to acquire, from a bitstream, management information of at least one three-dimensional partial region in a predetermined three-dimensional spatial region including 3D data representing a three-dimensional structure, wherein the management information includes positional information of the three-dimensional partial region in XYZ coordinates, and size information represented by a length of each side of the three-dimensional partial region in the XYZ coordinates; and decode coded data of the 3D data within the at least one three-dimensional partial region.

2. The image decoding device according to claim 1, wherein the at least one processor is further configured to perform editing of the decoded 3D data on a basis of the management information and an instruction by a user of the image decoding device.

3. The image decoding device according to claim 2, wherein the at least one three-dimensional partial region includes a plurality of three-dimensional partial regions, and the editing of the decoded 3D data includes synthesizing of the plurality of three-dimensional partial regions.

4. The image decoding device according to claim 1, wherein the at least one three-dimensional partial region includes a first three-dimensional partial region and a second three-dimensional partial region different from the first three-dimensional partial region, the first three-dimensional partial region is partially overlapped with the second three-dimensional partial region, and the at least one processor is configured to decode, on a basis of management information of the first three-dimensional partial region, the first three-dimensional partial region independently from the second three-dimensional partial region.

5. The image decoding device according to claim 1, wherein the size information indicates that the at least one three-dimensional partial region is a block region having a rectangular shape.

6. The image decoding device according to claim 1, wherein the at least one processor is further configured to allow, in a case where partial region decoding is supported, the at least one three-dimensional partial region to be decoded independently.

7. The image decoding device according to claim 1, wherein the at least one processor is further configured to decode coded data of the 3D data within the at least one three-dimensional partial region independently from the other region of the predetermined three-dimensional spatial region.

8. An image decoding method comprising:

acquiring management information of at least one three-dimensional partial region in a predetermined three-dimensional spatial region including 3D data representing a three-dimensional structure, wherein the management information includes positional information of the three-dimensional partial region in XYZ coordinates, and size information represented by a length of each side of the three-dimensional partial region in the XYZ coordinates; and decoding coded data of the 3D data within the at least one three-dimensional partial region independently from the other region of the predetermined three-dimensional spatial region.

9. The image decoding method according to claim 8, further comprising:

performing editing of the decoded 3D data on a basis of the management information and an instruction by a user of the image decoding device.

10. The image decoding method according to claim 9, wherein the at least one three-dimensional partial region includes a plurality of three-dimensional partial regions, and the editing of the decoded 3D data includes synthesizing of the plurality of three-dimensional partial regions.

11. The image decoding method according to claim 8, wherein the at least one three-dimensional partial region includes a first three-dimensional partial region and a second three-dimensional partial region different from the first three-dimensional partial region, the first three-dimensional partial region is partially overlapped with the second three-dimensional partial region, and the method further comprises decoding, on a basis of management information of the first three-dimensional partial region, the first three-dimensional partial region independently from the second three-dimensional partial region.

12. The image decoding method according to claim 8, wherein the size information indicates that the at least one three-dimensional partial region is a block region having a rectangular shape.

13. The image decoding method according to claim 8, further comprising allowing, in a case where partial region decoding is supported, the at least one three-dimensional partial region to be decoded independently.

14. The image decoding device according to claim 8, further comprising decoding coded data of the 3D data within the at least one three-dimensional partial region independently from the other region of the predetermined three-dimensional spatial region.

* * * * *